US010458141B2

(12) United States Patent
Hensen

(10) Patent No.: US 10,458,141 B2
(45) Date of Patent: Oct. 29, 2019

(54) TORNADO SHELTER

(71) Applicant: Sam Thomas Hensen, Prosper, TX (US)

(72) Inventor: Sam Thomas Hensen, Prosper, TX (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 0 days.

(21) Appl. No.: 15/260,229

(22) Filed: Sep. 8, 2016

(65) Prior Publication Data

US 2017/0081870 A1    Mar. 23, 2017

Related U.S. Application Data

(60) Provisional application No. 62/220,178, filed on Sep. 17, 2015.

(51) Int. Cl.
*E04H 9/14* (2006.01)
*E04H 1/12* (2006.01)
*E04B 1/343* (2006.01)

(52) U.S. Cl.
CPC .......... *E04H 9/14* (2013.01); *E04B 1/34321* (2013.01); *E04B 1/34384* (2013.01); *E04H 1/12* (2013.01); *E04H 1/125* (2013.01); *Y02A 50/14* (2018.01)

(58) Field of Classification Search
CPC .. E04H 1/12; E04H 1/125; E04H 9/14; E04H 1/005; E04H 1/1205; E04H 9/10; E04B 1/34321; E04B 1/34384; E04B 1/02; E04B 1/14; E04B 1/24; E04B 1/3205; E04B 1/34315; E04B 1/3483; E04B 1/34869; E04B 2/04; E04C 2/32; E04D 3/30; Y02A 50/14

USPC .......................................................... 52/79.5
See application file for complete search history.

(56) References Cited

U.S. PATENT DOCUMENTS

| 1,784,368 | A | * | 12/1930 | Loucks | ..................... | E04B 7/20 |
| | | | | | | 29/433 |
| 2,576,530 | A | * | 11/1951 | Medal | ................... | E04B 2/7881 |
| | | | | | | 156/71 |
| 2,867,857 | A | | 1/1959 | McCarthy | | |

(Continued)

FOREIGN PATENT DOCUMENTS

WO    WO 2008/127466 A3    10/2008

OTHER PUBLICATIONS

Federal Emergency Management Agency Mitigation Directorate, Taking Shelter From the Storm: Building a Safe Room Inside Your House, Instruction Manual, Aug. 1999, 65 pages, Second Edition, Texas Tech University Wind Engineering Research Center, USA.

(Continued)

*Primary Examiner* — Joshua J Michener
*Assistant Examiner* — James Buckle, Jr.
(74) *Attorney, Agent, or Firm* — James R. Cypher; Charles R. Cypher

(57) ABSTRACT

A protective enclosure that is primarily constructed from corrugated, symmetrical panel members of uniform shape. The panel members are made from steel. The panel members are connected together to form the walls and roof of the enclosure. The enclosure is connected to a cementitious member to anchor the enclosure. The enclosure is provided with a door that completes the enclosure and allows entry and exit from the enclosure.

18 Claims, 27 Drawing Sheets

(56) References Cited

U.S. PATENT DOCUMENTS

| | | | |
|---|---|---|---|
| 2,918,151 A * | 12/1959 | Kennedy | E04B 1/08 52/539 |
| 3,132,446 A * | 5/1964 | Schleig | E04B 1/6104 52/537 |
| 3,343,314 A | 9/1967 | Smith | |
| 3,421,279 A * | 1/1969 | Franc | B21D 13/045 428/599 |
| 3,568,388 A * | 3/1971 | Flachbarth et al. | E04B 2/72 52/241 |
| 3,570,293 A * | 3/1971 | Blaski | B21D 47/00 72/177 |
| 3,657,849 A * | 4/1972 | Garton | E04B 1/0007 52/293.3 |
| 3,959,942 A * | 6/1976 | Merson | E04B 1/3205 52/551 |
| 3,967,430 A * | 7/1976 | Knudson | B21D 11/08 29/243.5 |
| 4,037,379 A * | 7/1977 | Ozanne | E04C 2/3405 52/404.3 |
| 4,120,123 A * | 10/1978 | Knudson | E04B 1/18 52/406.2 |
| 4,126,972 A | 11/1978 | Silen | |
| 4,186,541 A * | 2/1980 | Sivachenko | E01D 19/02 52/630 |
| 4,291,510 A * | 9/1981 | Sivachenko | E04D 3/30 52/22 |
| 4,754,584 A | 7/1988 | Newton, II | |
| 5,233,799 A * | 8/1993 | Abukawa | B21D 5/08 52/53 |
| 5,337,535 A * | 8/1994 | Maupin | E04B 1/08 52/262 |
| 5,472,247 A | 12/1995 | Monson | |
| 5,526,628 A * | 6/1996 | Knudson | E04B 1/08 52/528 |
| 5,579,615 A * | 12/1996 | Hoffman | E06B 9/00 49/464 |
| 5,611,178 A * | 3/1997 | Aubert | E04H 9/12 109/1 S |
| 5,619,837 A * | 4/1997 | DiSanto | E04C 2/08 52/630 |
| 5,813,174 A | 9/1998 | Waller | |
| 5,921,043 A | 7/1999 | McDonald | |
| 5,956,907 A | 9/1999 | Martin | |
| 5,996,292 A * | 12/1999 | Hill | E06B 9/02 49/57 |
| 6,079,168 A * | 6/2000 | Shaver | E06B 9/02 49/464 |
| 6,131,343 A * | 10/2000 | Jackson, Jr. | E04H 9/14 52/169.6 |
| 6,226,932 B1 | 5/2001 | Friedrich | |
| 6,293,055 B1 | 9/2001 | Watson | |
| 6,293,637 B1 * | 9/2001 | Anderson | H02B 1/301 211/26 |
| 6,343,433 B1 | 2/2002 | Tylicki, Jr. | |
| 6,349,508 B1 | 2/2002 | Ju et al. | |
| 6,393,776 B1 | 5/2002 | Waller et al. | |
| 6,415,557 B1 * | 7/2002 | McCalley | E04B 1/08 109/1 S |
| 6,415,558 B1 * | 7/2002 | Cherry | E04H 9/14 292/138 |
| 6,438,906 B1 | 8/2002 | Komarowski et al. | |
| 6,539,674 B2 | 4/2003 | Arnold | |
| 7,080,489 B2 | 7/2006 | Jedrzejewski | |
| 7,234,277 B2 | 6/2007 | Savin | |
| 7,451,573 B2 * | 11/2008 | Orszulak | E04B 2/767 52/167.1 |
| 7,690,159 B1 * | 4/2010 | Arnold | A01K 1/0035 108/35 |
| 8,281,551 B2 | 10/2012 | Leek et al. | |
| 8,322,085 B2 | 12/2012 | Plumley | |
| 8,474,215 B2 | 7/2013 | DeRose | |
| 8,549,797 B1 | 10/2013 | Ricketts | |
| 8,572,904 B2 | 11/2013 | Ali | |
| 8,590,237 B2 * | 11/2013 | Stella | E04B 1/18 52/270 |
| 8,689,518 B2 * | 4/2014 | Gridley | E02D 27/10 52/167.1 |
| 9,394,714 B1 * | 7/2016 | Willsey | E04H 9/14 |
| 9,869,090 B2 * | 1/2018 | Wilson | E01F 5/005 |
| D844,838 S * | 4/2019 | Li | D25/33 |
| 2004/0177568 A1 * | 9/2004 | Hanks | E04H 9/14 52/79.1 |
| 2005/0126105 A1 * | 6/2005 | Leek | E04H 9/02 52/633 |
| 2005/0284073 A1 * | 12/2005 | Leek | E04H 9/02 52/580 |
| 2006/0254166 A1 * | 11/2006 | Michels | E04H 9/14 52/270 |
| 2008/0190065 A1 * | 8/2008 | Craig | E04H 9/14 52/586.1 |
| 2010/0115858 A1 * | 5/2010 | Olsen | E04H 9/14 52/79.1 |
| 2011/0023759 A1 | 2/2011 | Waller | |
| 2011/0105011 A1 | 5/2011 | Dubensky et al. | |
| 2011/0162293 A1 * | 7/2011 | Levy | E04B 1/3483 52/79.9 |
| 2012/0077429 A1 * | 3/2012 | Wernimont | F24F 3/161 454/187 |
| 2013/0118097 A1 | 5/2013 | Kaiser | |
| 2013/0145702 A1 | 6/2013 | Oba | |
| 2013/0247485 A1 | 9/2013 | Zimmerman et al. | |
| 2017/0170775 A1 * | 6/2017 | Chabas | E04D 3/30 |
| 2017/0350114 A1 * | 12/2017 | Crozier | E04B 1/34336 |

OTHER PUBLICATIONS

Federal Emergency Management Agency Mitigation Directorate, National Performance Criteria for Tornado Shelters, Instruction Manual, May 28, 1999, 8 pages, First Edition, Texas Tech University Wind Engineering Research Center, USA.

* cited by examiner

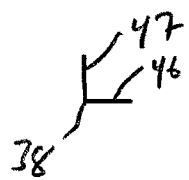 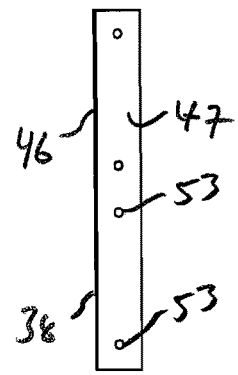 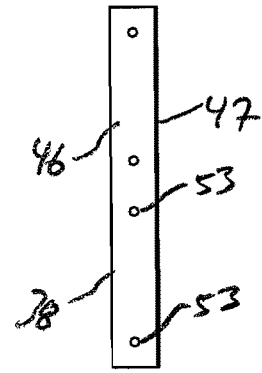
Fig. 30        Fig. 31        Fig. 32
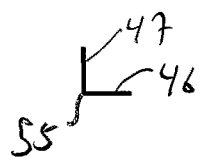 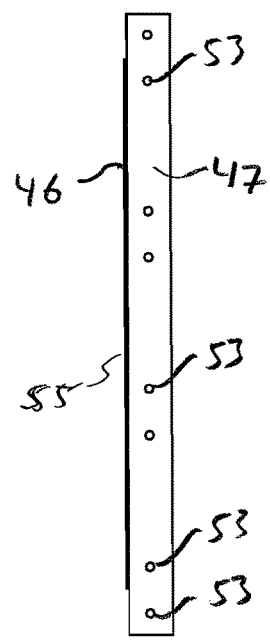 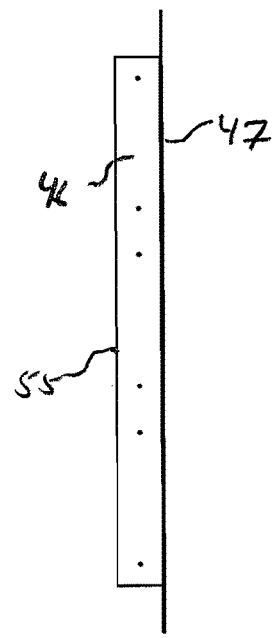
Fig. 33        Fig. 34        Fig. 35

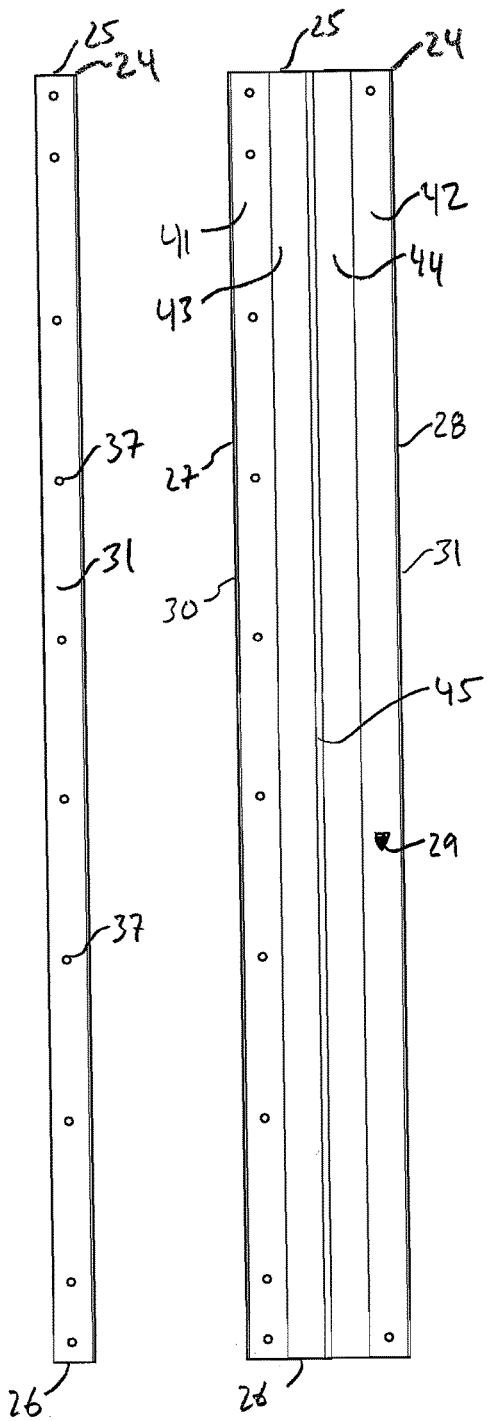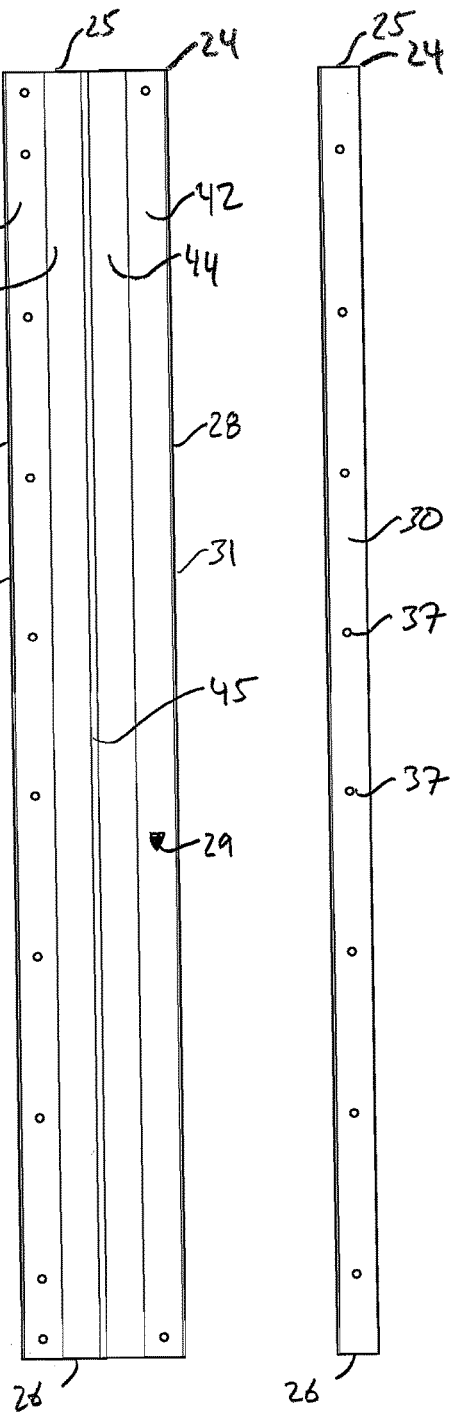
Fig. 60  Fig. 61  Fig. 62  Fig. 63

TORNADO SHELTER

BACKGROUND OF THE INVENTION

This invention is directed to a tornado shelter that takes the form of an especially constructed enclosure or room typically provided above-ground, in a house or other building. The enclosure is strong enough to provide a high degree of occupant protection during most tornados and other high wind events.

The Federal Emergency Management Agency (FEMA) has suggested criteria for such above-ground enclosures. The criteria are discussed in the following publications: "National Performance Criteria for Tornado Shelters", $1^{st}$ Edition, published May 8, 1999, and "Taking Shelter from the Storm: Building a Safe Room Inside Your House", Booklet #320, $2^{nd}$ Edition, published August 1999. According to the criteria the enclosure should be able to withstand wind pressures developed from winds gusting for three seconds at 250 miles per hour. The enclosure must also be able to withstand the impact without perforation of a 15 lb. 2×4 wooden board traveling at a speed of 100 miles per hour horizontally along the board's longitudinal axis and vertically at 67 miles per hour.

A number of inventions related to above-ground tornado shelters have been patented. These are sometimes called safe rooms. Many of these structures form the walls and ceiling of the structure with metal panels. Of particular relevance, U.S. Pat. No. 5,813,174, granted to Waller, taught a shelter that can be easily erected within an existing building from components that can be stacked and shipped in a compact manner. Waller also taught being able to build the enclosure around the installer for ease of installation in a small existing room of a building. Similarly, U.S. Pat. No. 6,415,557, granted to McCalley in 2002, and U.S. Pat. No. 6,415,558, granted to Cherry in 2002, both teach shelters that can be erected within an existing building, from the inside of the enclosure, with components that can be shipped efficiently.

U.S. Pat. No. 6,415,558, granted to Cherry, is particularly concerned with using standard fasteners for connecting the panels of the structure rather than specially made parts. This made manufacturing the enclosure less expensive, and it arguably made the enclosure easier to erect by users without specialized training. Cherry was also particularly concerned with the particular manner in which the entry and exit door was connected to the other components of the enclosure and the operation of the door. On the other hand, McCalley emphasizes that the connections between his panels were designed to allow for "give" or "play" between the panels so as to dissipate the energy imparted from an impact and thereby resist penetration.

U.S. Pat. No. 5,813,174, granted to Waller, teaches connecting the panels of the structure to frame components that are connected to each other and anchored to the ground, while Cherry cites as a benefit of his invention that a "separate, integrated frame structure" is not needed. However, Cherry still teaches and claims connecting his panels at the edges of the enclosure to separate elongated framing members. McCalley, similarly, teaches using separate elongated framing members to connect the panels.

SUMMARY OF THE INVENTION

The present invention provides an enclosure that can meet the FEMA performance criteria that is also easily assembled from relatively inexpensive components.

The present invention provides an enclosure that can withstand the pressures imposed by a 250 mph ground level wind as well as the impact from a 15 lb., 2×4 wooden building stud traveling at 100 mph horizontally and 67 mph vertically.

The enclosure of the present invention is primarily constructed from corrugated, symmetrical panel members of uniform shape. The panel members are preferably made from steel. The panel members are connected together to form the walls and roof of the enclosure. The enclosure is connected to a cementitious member to anchor the enclosure. The enclosure is provided with a door that completes the enclosure and allows entry and exit from the enclosure.

The enclosure of the present invention is formed in a manner that an installer can easily assemble the structure with commonly available tools and with little or no specialized training.

The enclosure of the present invention is formed in a manner that the user can mostly assemble the enclosure from what will become the inside of the enclosure. In this manner, the enclosure can be constructed in a small room where access to the outside of the shelter may be difficult.

The enclosure of the present invention is also formed in a manner that the enclosure can also be partially or fully disassembled from inside the enclosure. This is particularly useful if the door to the shelter is blocked and another exit needs to be created to leave the shelter by the occupants taking refuge.

The enclosure of the present invention is also formed such that the panels are connected directly to each other and separate framing members are needed only at certain edges of the enclosure.

The enclosure of the present invention is formed in such a manner that it is economical to manufacture and ship.

The enclosure of the present invention is also formed such that the component pieces are of a size that they can be manipulated by a single person, erecting the shelter alone.

DESCRIPTION OF THE DRAWINGS

FIG. 8, taken along line 8-8 of FIG. 4, is an inside, sectional view of the right end wall of the enclosure of the present invention. The view of the left end wall is similar.

FIG. 30 is an end view of one of the bottom caps of the front wall of the enclosure.

FIG. 31 is a front view of one of the bottom caps of the front wall of the enclosure.

FIG. 32 is a top view of one of the bottom caps of the front wall of the enclosure.

FIG. 33 is an end view of the top piece of the door frame in the front wall of the enclosure.

FIG. 34 is a front view of the top piece of the door frame in the front wall of the enclosure.

FIG. 35 is a top view of the top piece of the door frame in the front wall of the enclosure.

FIG. 40 is a top view of a door header panel of the enclosure of the present invention. The bottom view is similar.

FIG. 44 is a top view of a first corner wall panel of the enclosure of the present invention. The bottom view is similar.

FIG. 48 is a top view of a roof end panel of the enclosure of the present invention. The bottom view is similar.

FIG. 49 is a right side view of the roof end panel of the enclosure.

FIG. 52 is a top view of a first door frame panel of the enclosure of the present invention. The bottom view is similar.

FIG. 53 is a right side view of the first door frame panel of the enclosure.

FIG. 54 is a front view of the first door frame panel of the enclosure.

FIG. 55 is a left side view of the first door frame panel of the enclosure.

FIG. 56 is a top view of an alternate door frame panel of the enclosure of the present invention. The bottom view is similar.

FIG. 57 is a right side view of the alternate door frame panel of the enclosure.

FIG. 58 is a front view of the alternate door frame panel of the enclosure.

FIG. 59 is a left side view of the alternate door frame panel of the enclosure.

FIG. 60 is a top view of an alternate corner wall panel of the enclosure of the present invention. The bottom view is similar.

FIG. 61 is a right side view of the alternate corner wall panel of the enclosure.

FIG. 62 is a front view of the alternate corner wall panel of the enclosure.

FIG. 63 is a left side view of the alternate corner wall panel of the enclosure.

DETAILED DESCRIPTION OF THE PREFERRED EMBODIMENT

Figure 1:
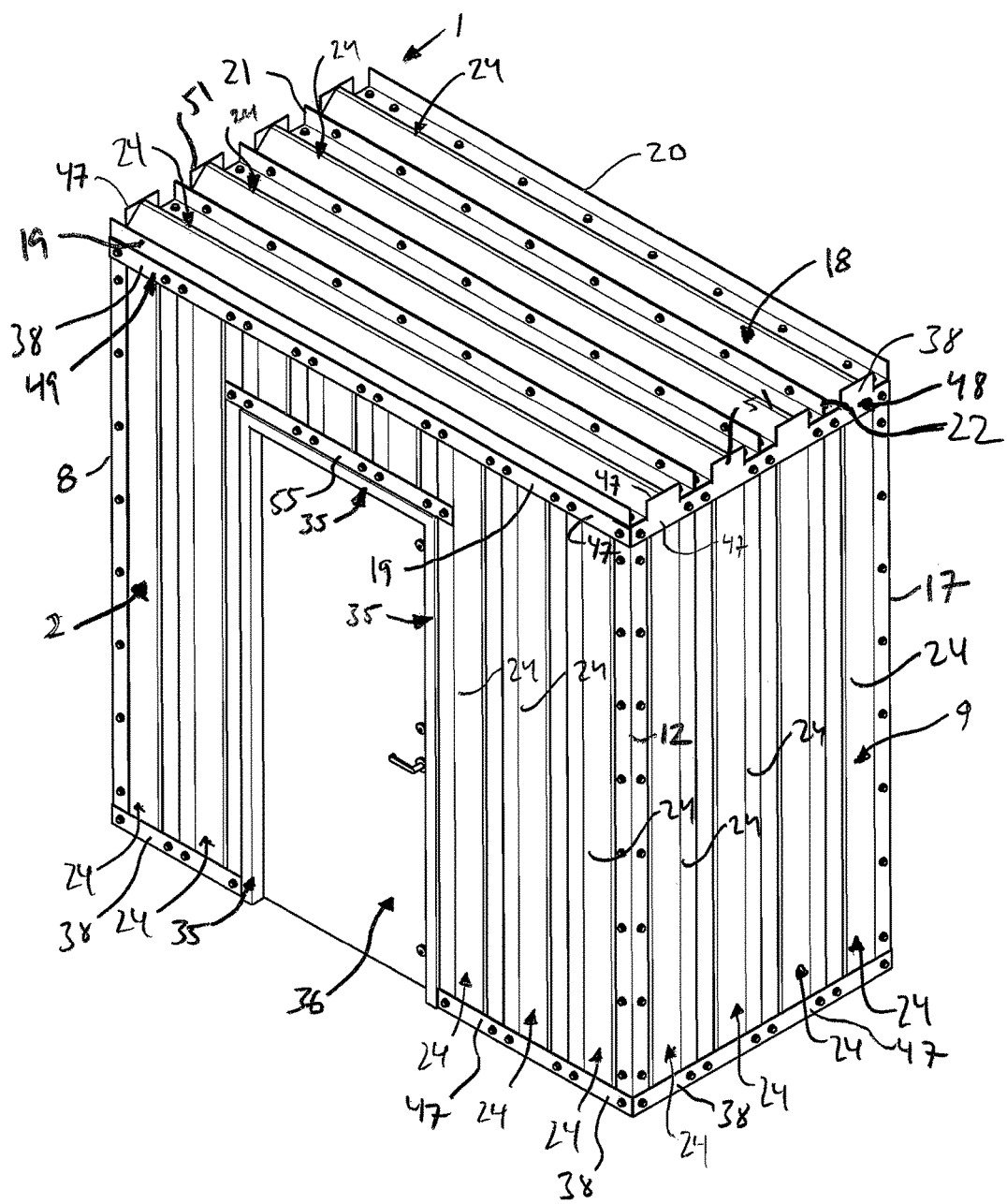
FIG. 1 is a perspective view of the enclosure of the present invention.
Figure 2:
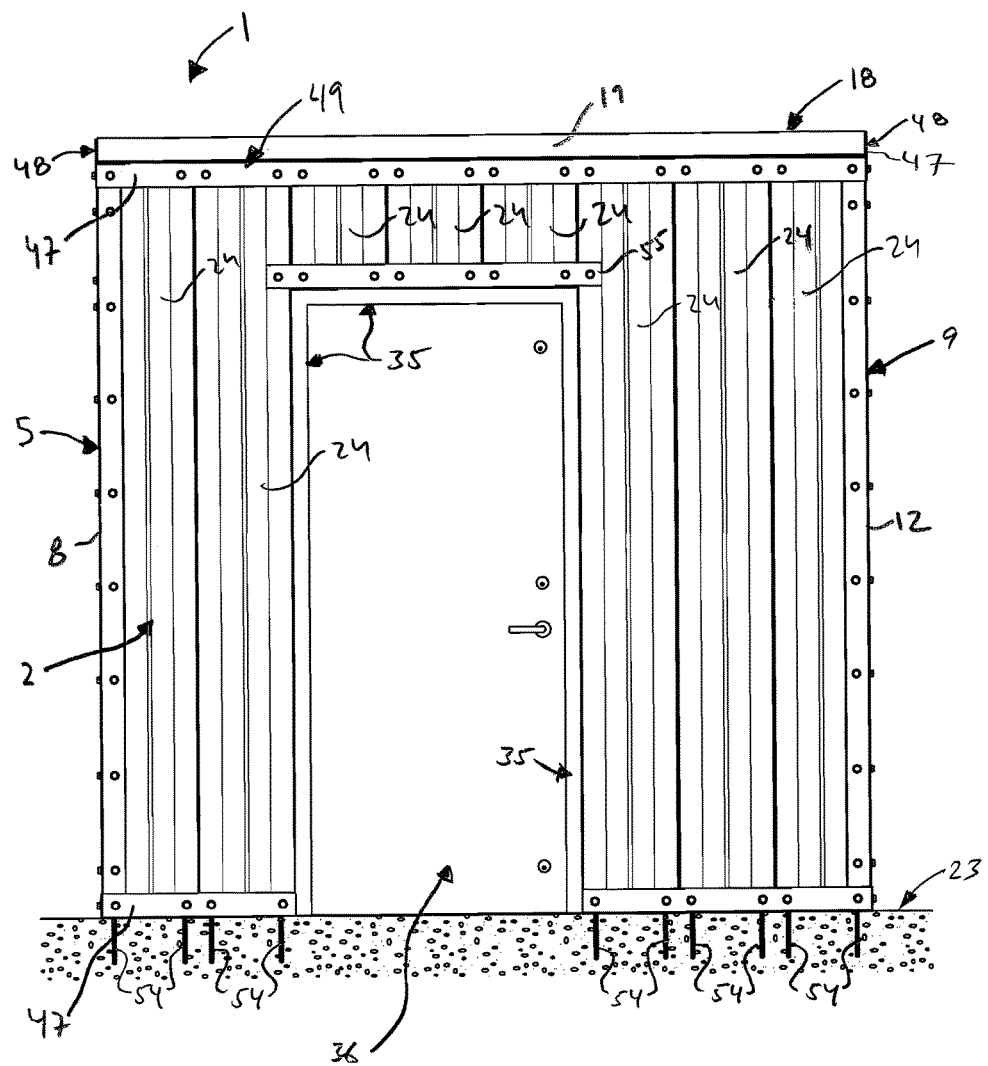
FIG. 2 is a front view of the enclosure of the present invention, showing the front wall, doorway and door of the enclosure of the present invention.
Figure 3:
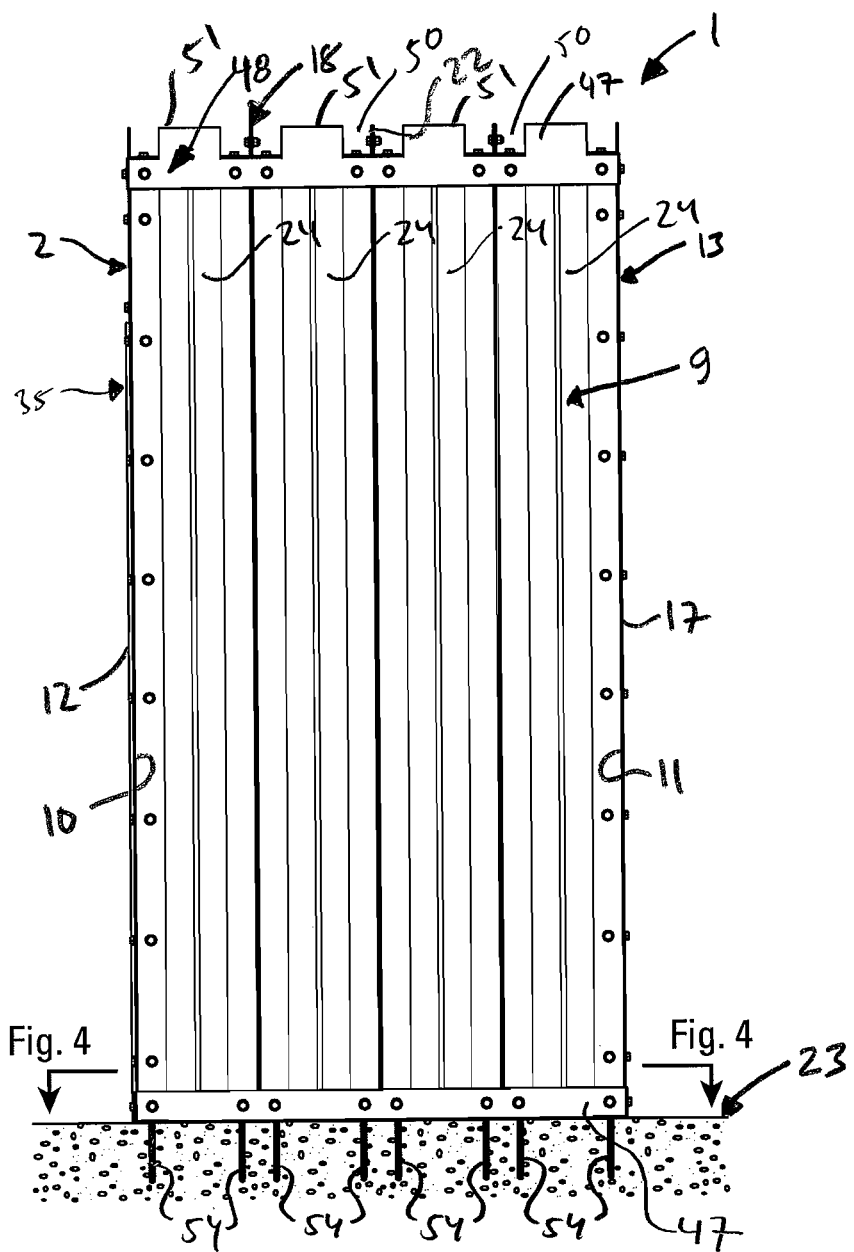
FIG. 3, taken along line 3-3 of FIG. 4, is a right side view of the right end wall of the present invention.

As shown in FIGS. 1 and 2, the present invention is a protective enclosure 1. The enclosure has a front wall 2 having a left edge 3 and a right edge 4. A left end wall 5 is attached to the front wall 2. The left end wall 5 has a front edge 6 and a back edge 7. The left end wall 5 is attached to the front wall 2 at a left, front edge 8 of the enclosure 1. A right end wall 9 is attached to the right edge 4 of the front wall 2. The right end wall 9 has a front edge 10 and a back edge 11. The right end wall 9 attaches to the front wall 2 at a right, front edge 12 of the enclosure 1. The enclosure has a back wall 13 having a left edge 14 and a right edge 15. The back wall 13 is attached to the left end wall 5 at a left, back edge 16 of the enclosure 1, and the back wall 13 is attached to the right end wall 9 at a right, back edge 17 of the enclosure 1. The enclosure 1 also has a roof 18 having front, back and left and right boundary edges 19, 20, 21 and 22. The roof 18 is attached to the front wall 2 at the front boundary edge 19. The roof 18 is attached to the back wall 13 at the back boundary edge 20. The roof is attached to the left end wall 5 at the left boundary edge 21 and to the right end wall 9 at the right boundary edge 22. The enclosure 1 is supported by and is attached to a base 23. Preferably, the foundation base 23 is made from cement. Each of the walls 2, 5, 9 and 13 is attached to the base. The enclosure 1 is also formed with an opening large enough for a human to enter and exit the enclosure 1.

Figure 4:
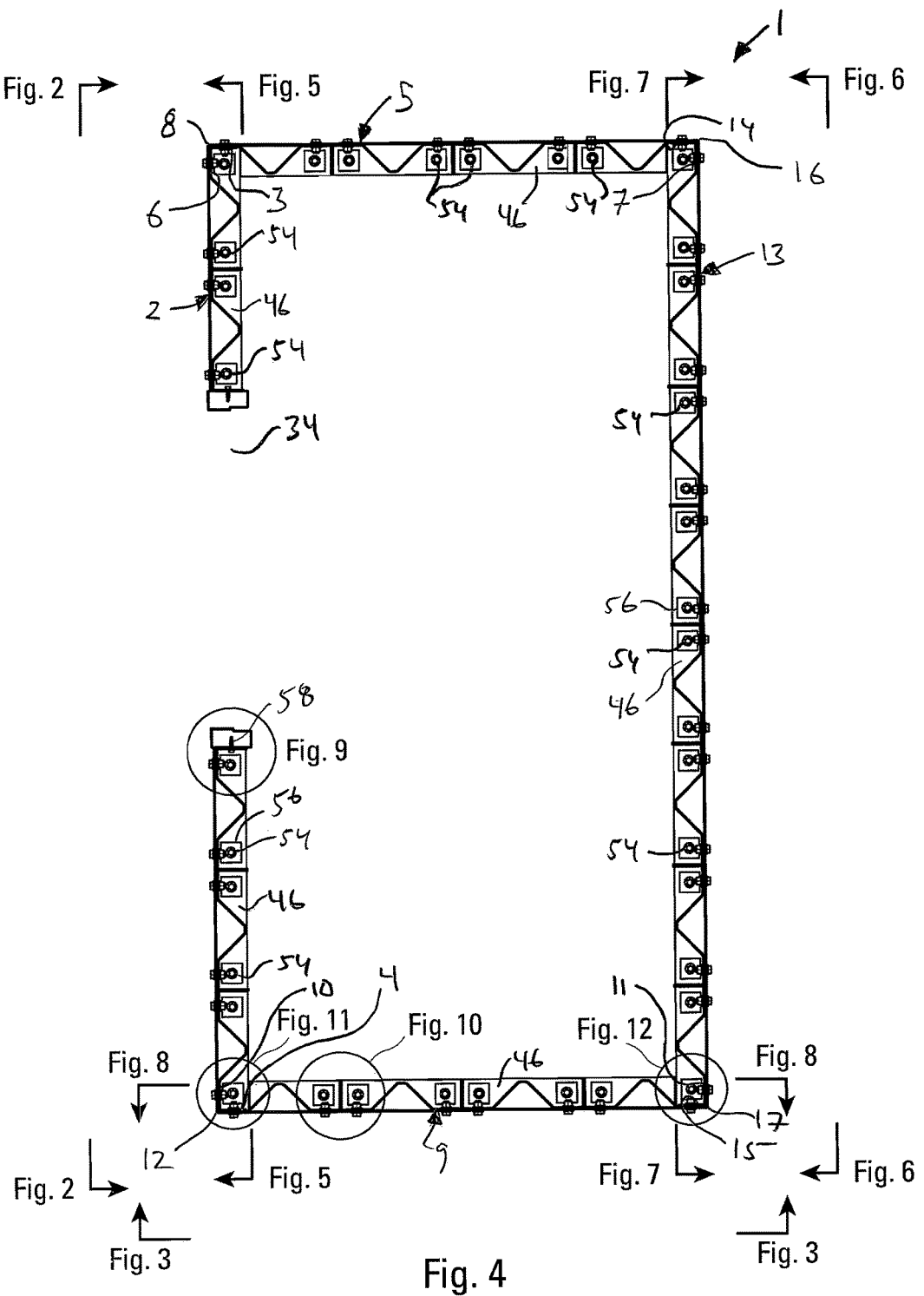
FIG. 4, taken along line 4-4 of FIG. 3, is a top plan, sectional view of the enclosure of the present invention.
Figure 5:
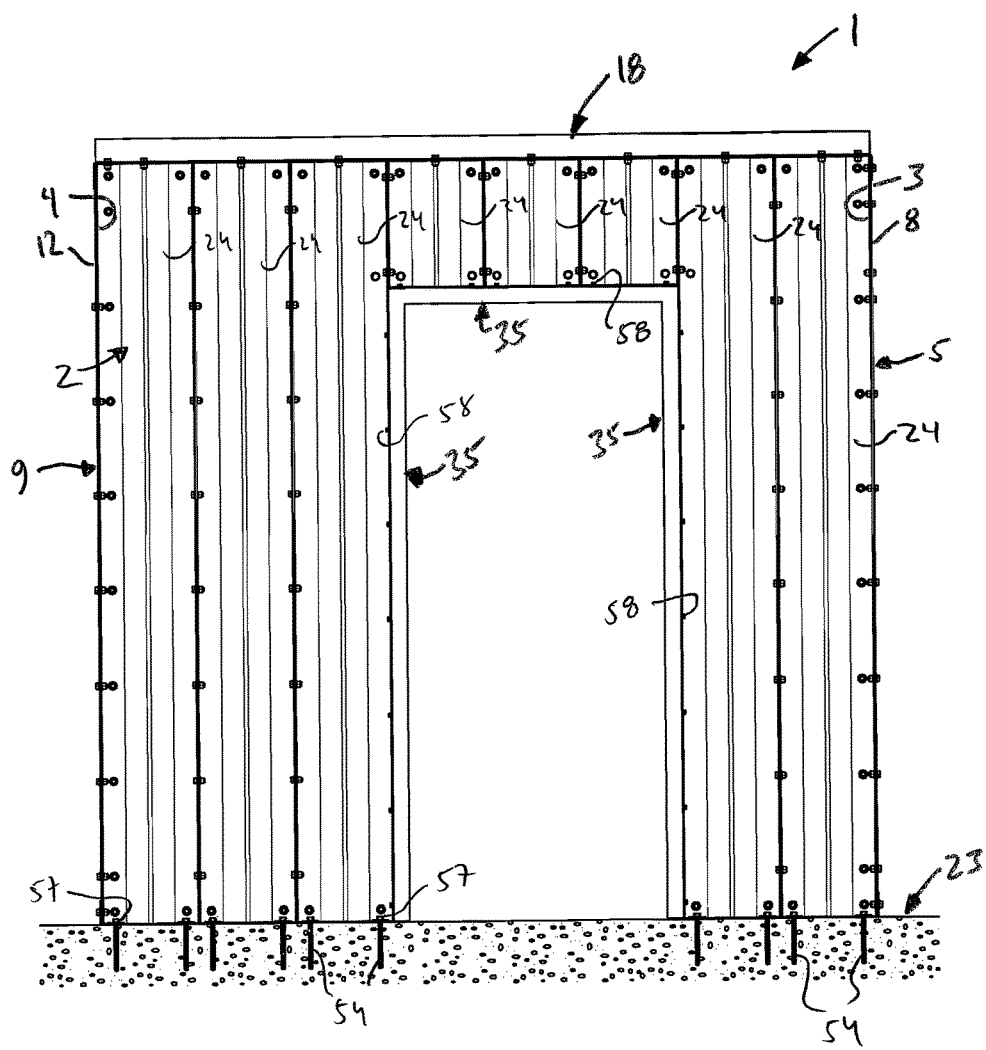
FIG. 5, taken along line 5-5 of FIG. 4, is an inside, sectional view of the front wall of the enclosure of the present invention. The base foundation is shown with anchors embedded in the base foundation. The door is not shown.
Figure 6:
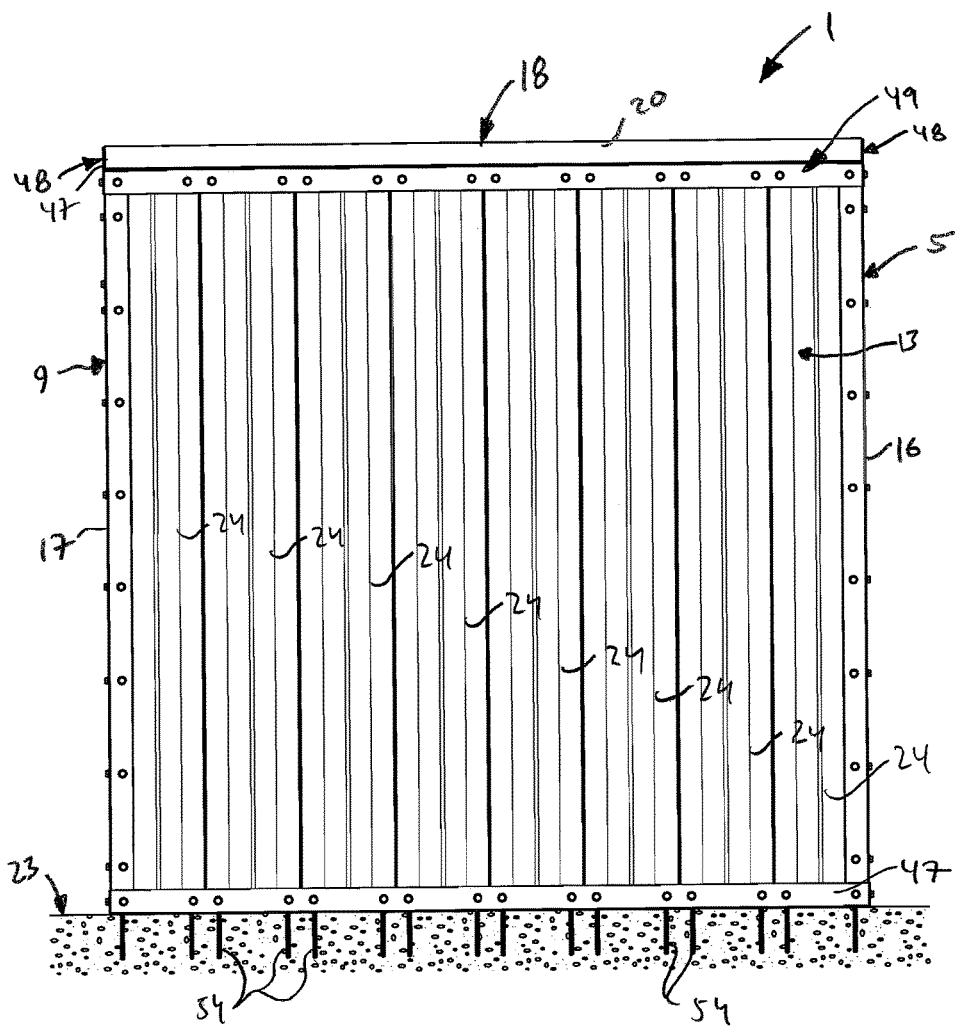
FIG. 6, taken along line 6-6 of FIG. 4, is a view of the back wall of the enclosure of the present invention.
Figure 7:
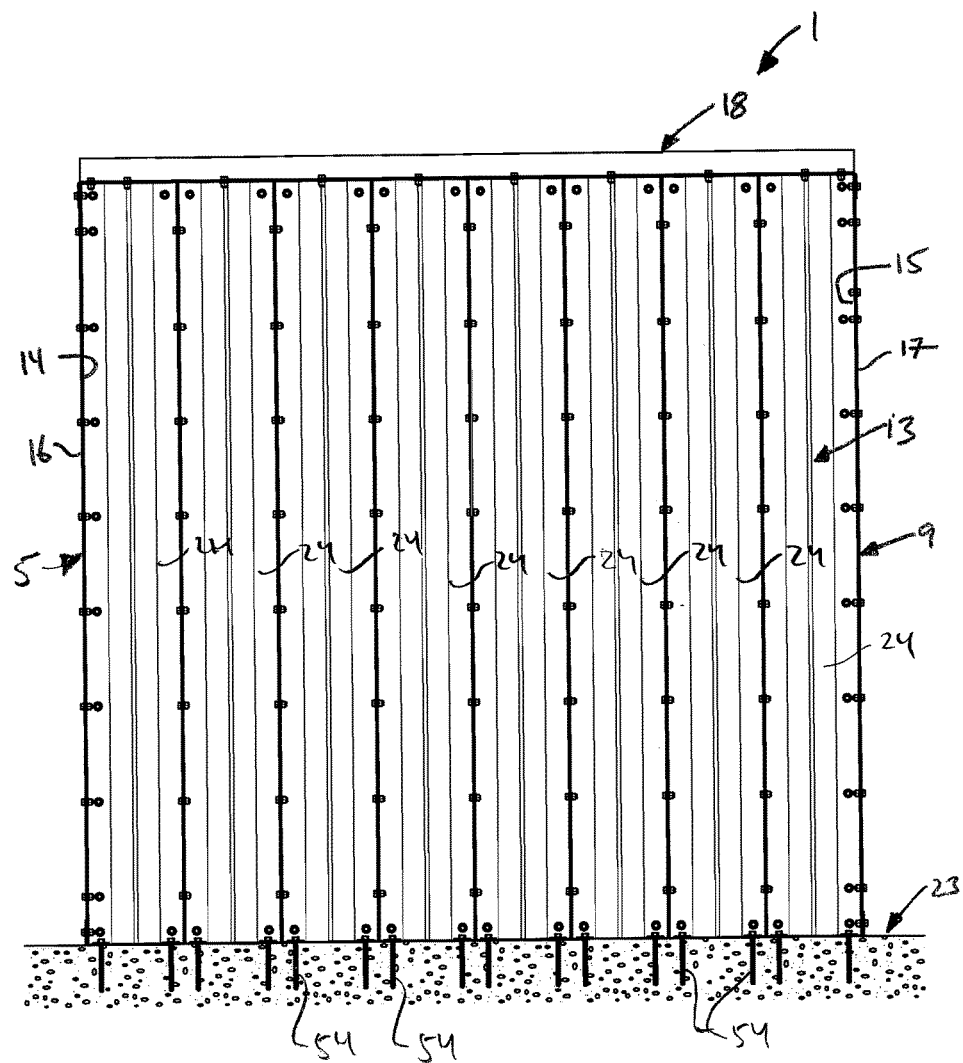
FIG. 7, taken along line 7-7 of FIG. 4, is an inside, sectional view of the back wall of the enclosure of the present invention.
Figure 8:
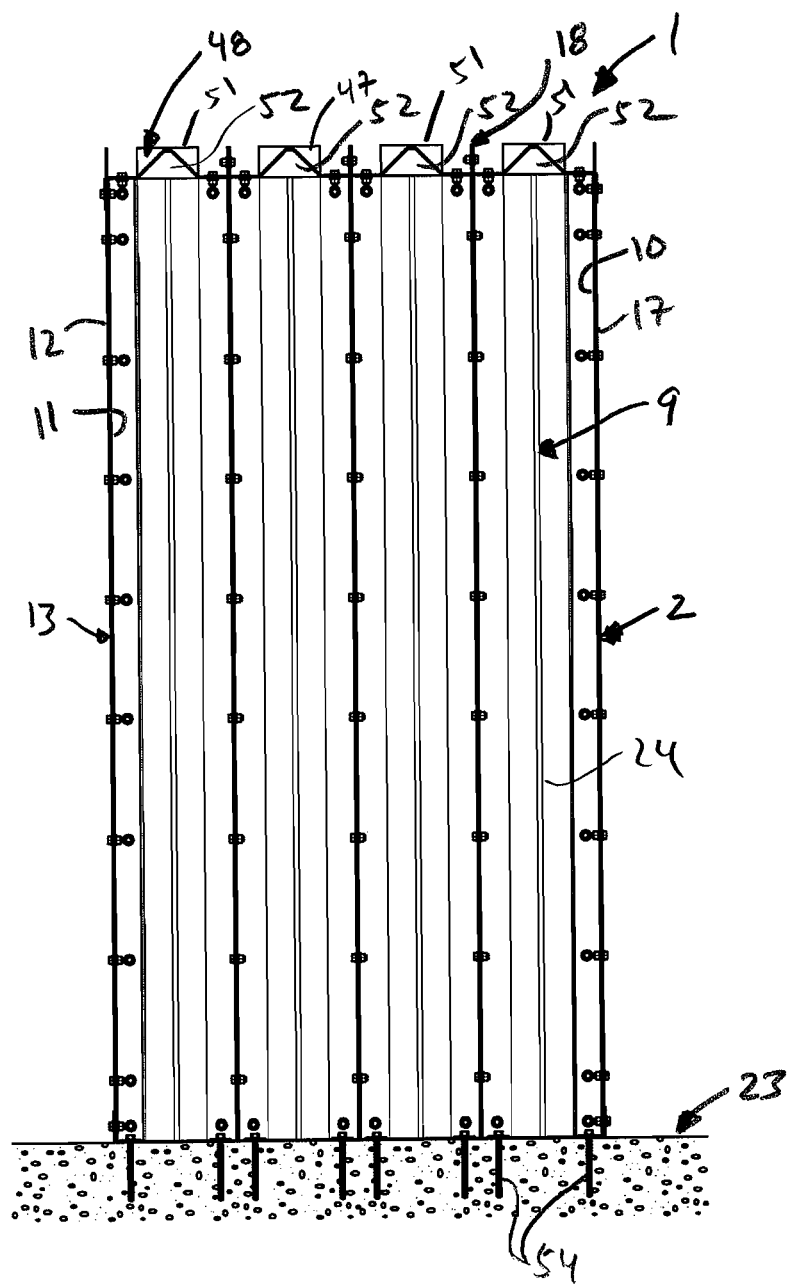
Figures 36, 37, 38, 39:
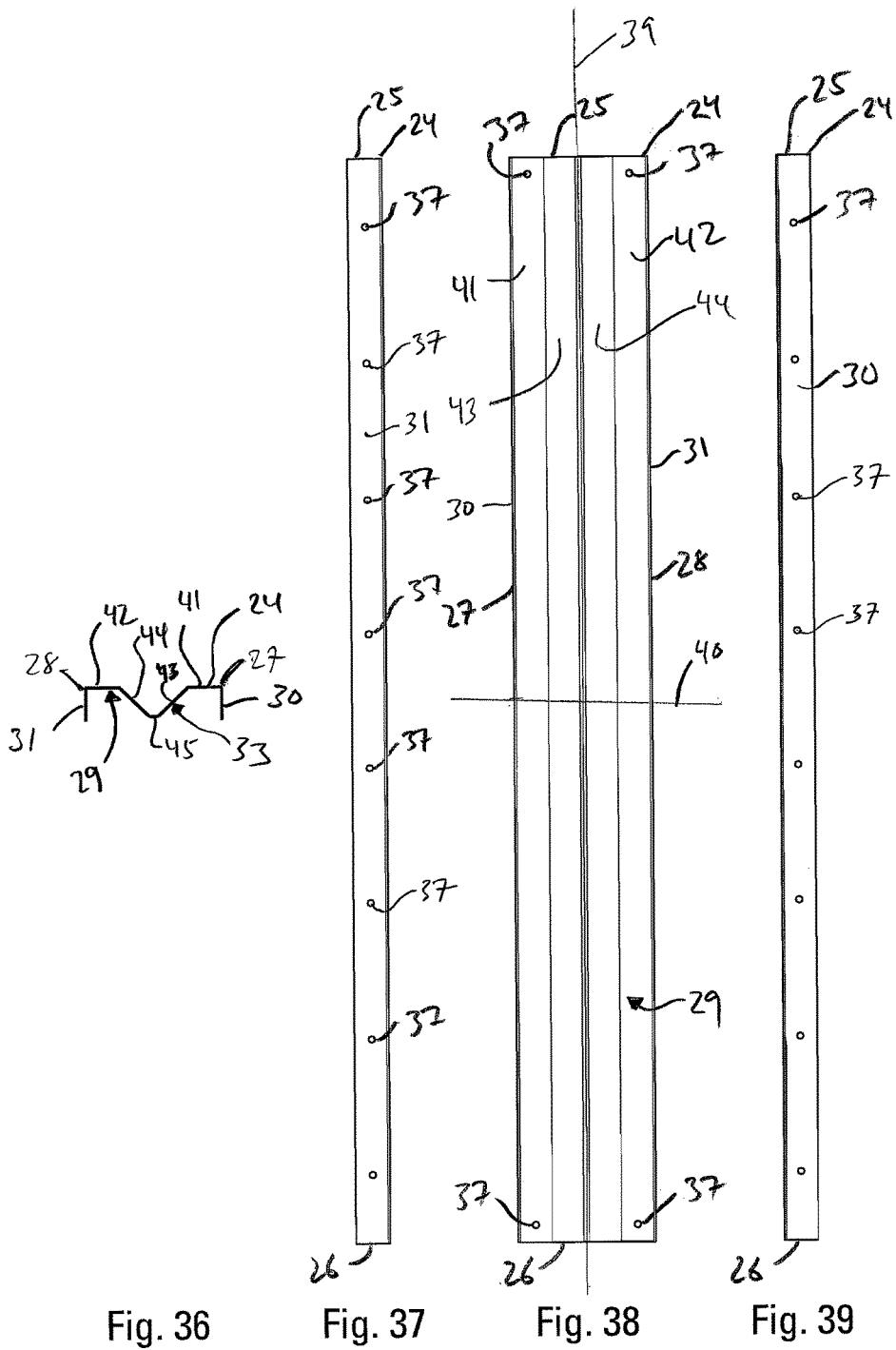
FIG. 36 is a top view of a middle panel of the enclosure of the present invention. The bottom view is similar. The middle panels are bordered on either side by other panels. The middle panels are also used in both the roof and walls of the structure or enclosure.
FIG. 37 is a right side view of the middle panel of the enclosure.
FIG. 38 is a front view of the middle panel of the enclosure.
FIG. 39 is a left side view of the middle panel of the enclosure.
Figure 40:
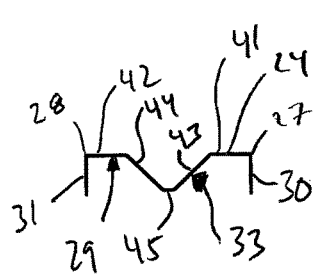
Figures 41, 42:
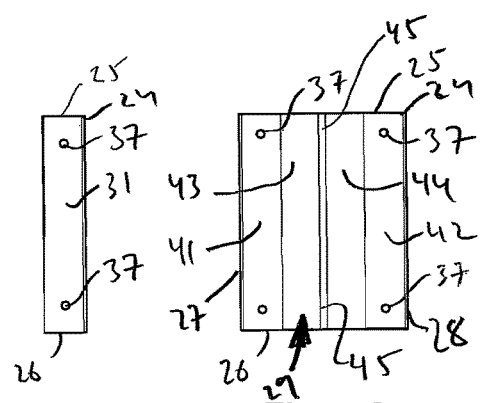
FIG. 41 is a right side view of the door header panel of the enclosure.
FIG. 42 is a front view of the door header panel of the enclosure.
Figure 43:
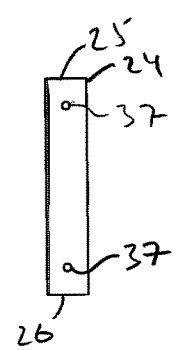
FIG. 43 is a left side view of the door header panel of the enclosure.
Figure 44:
Figure 45:
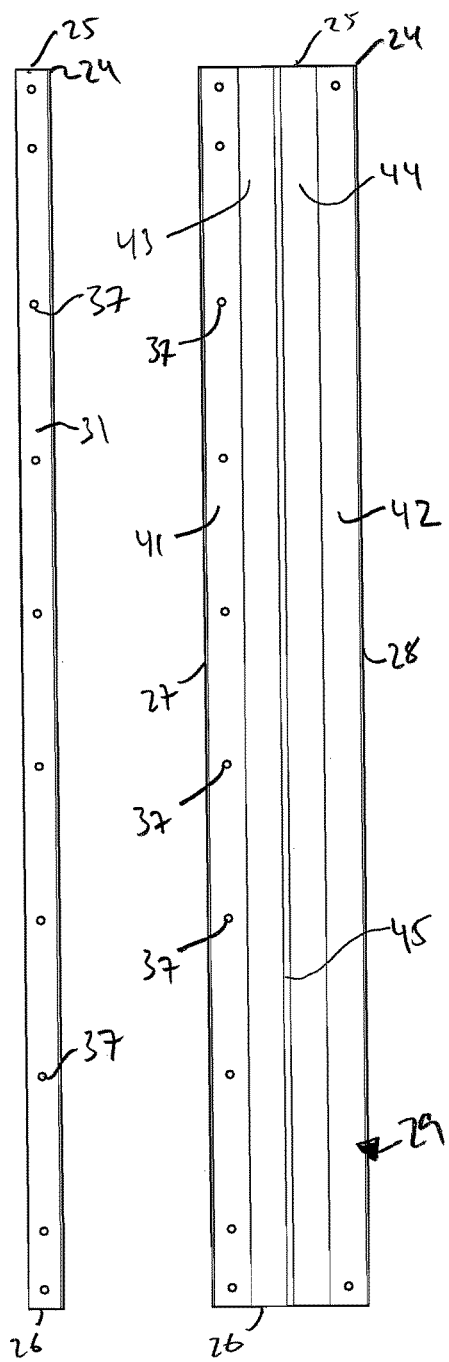
FIG. 45 is a right side view of the first corner wall panel of the enclosure.
Figure 46:
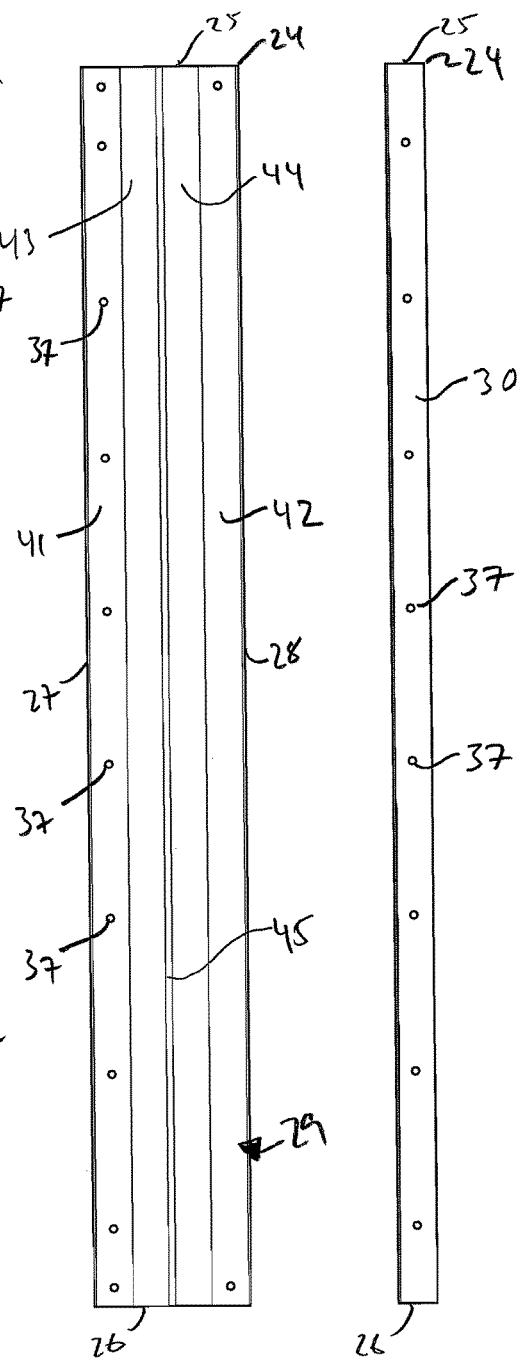
FIG. 46 is a front view of the first corner wall panel of the enclosure.
Figure 47:
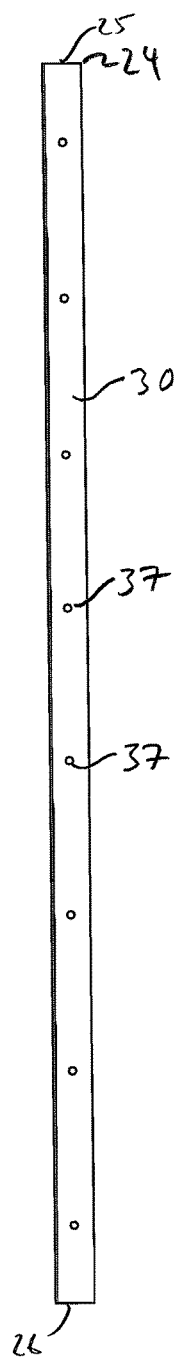
FIG. 47 is a left side view of the first corner wall panel of the enclosure.
Figure 48:
Figure 50:
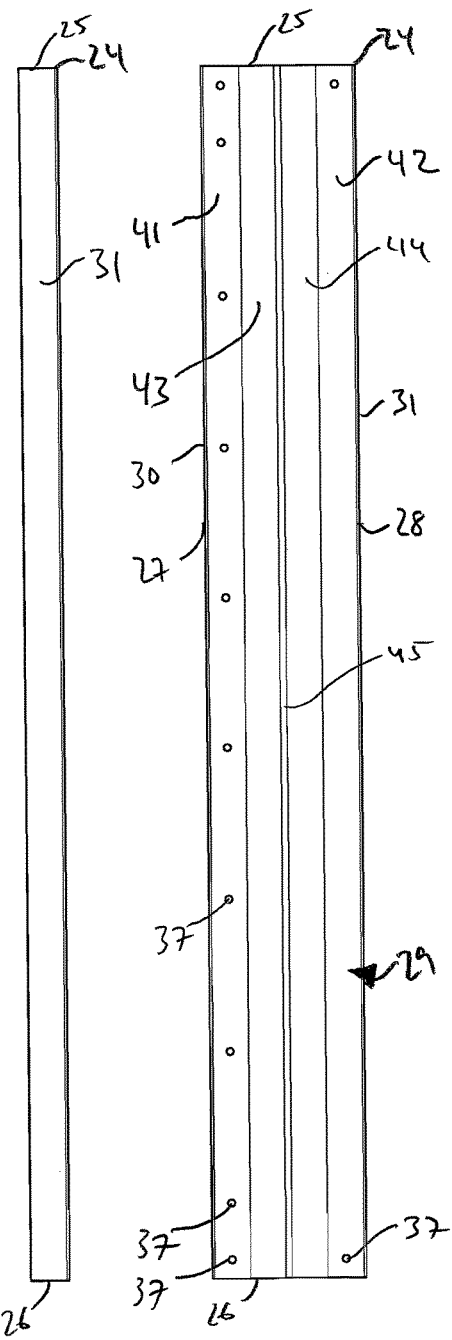
FIG. 50 is a front view of the roof end panel of the enclosure.
Figure 51:
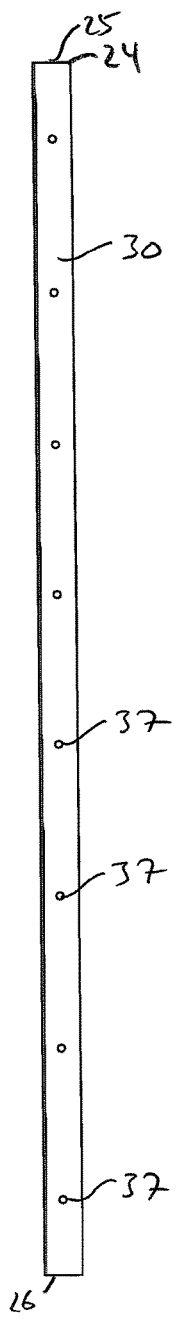
FIG. 51 is a left side view of the roof end panel of the enclosure.
Figures 52, 53, 54, 55:
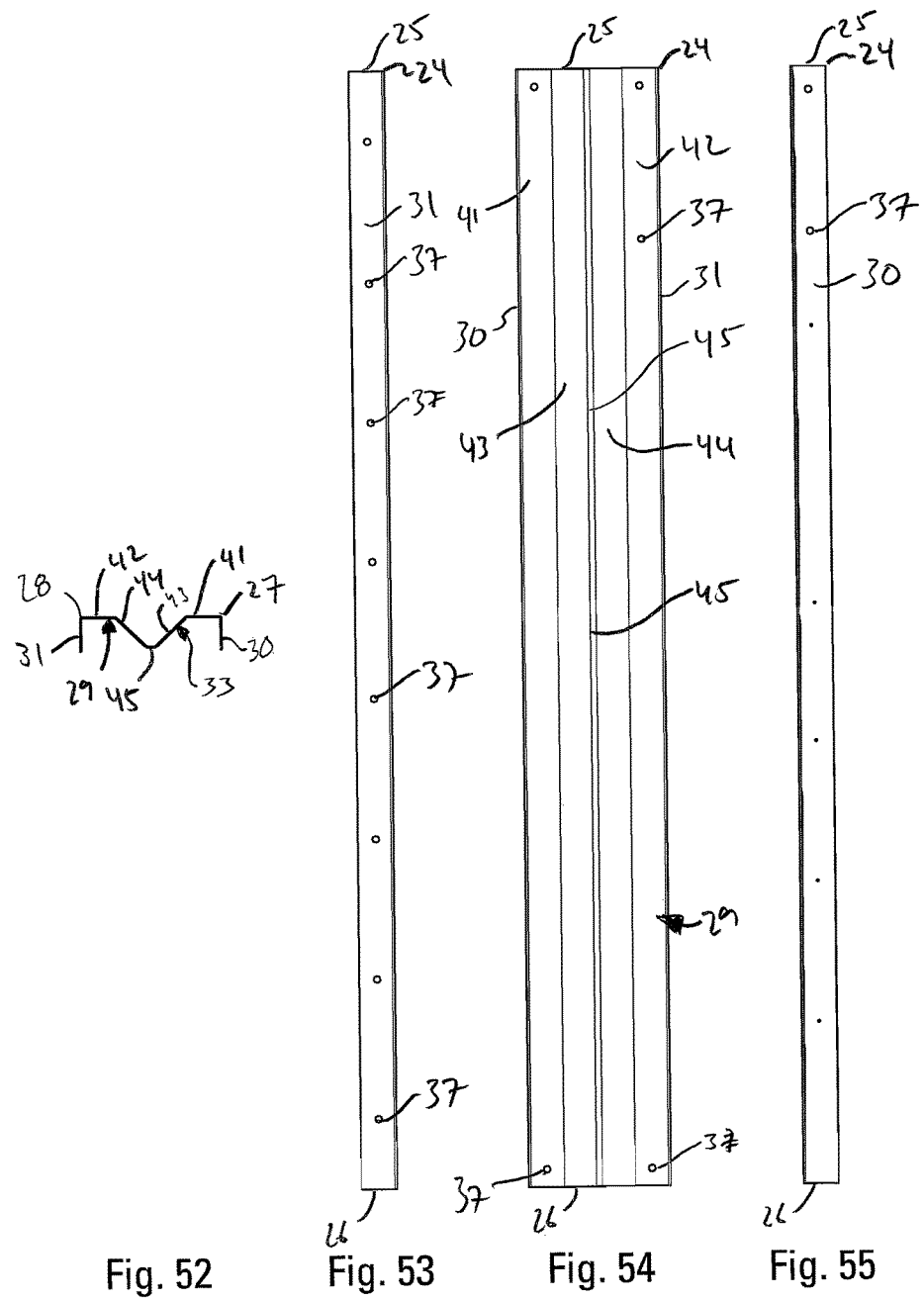
Figures 56, 57, 58, 59:
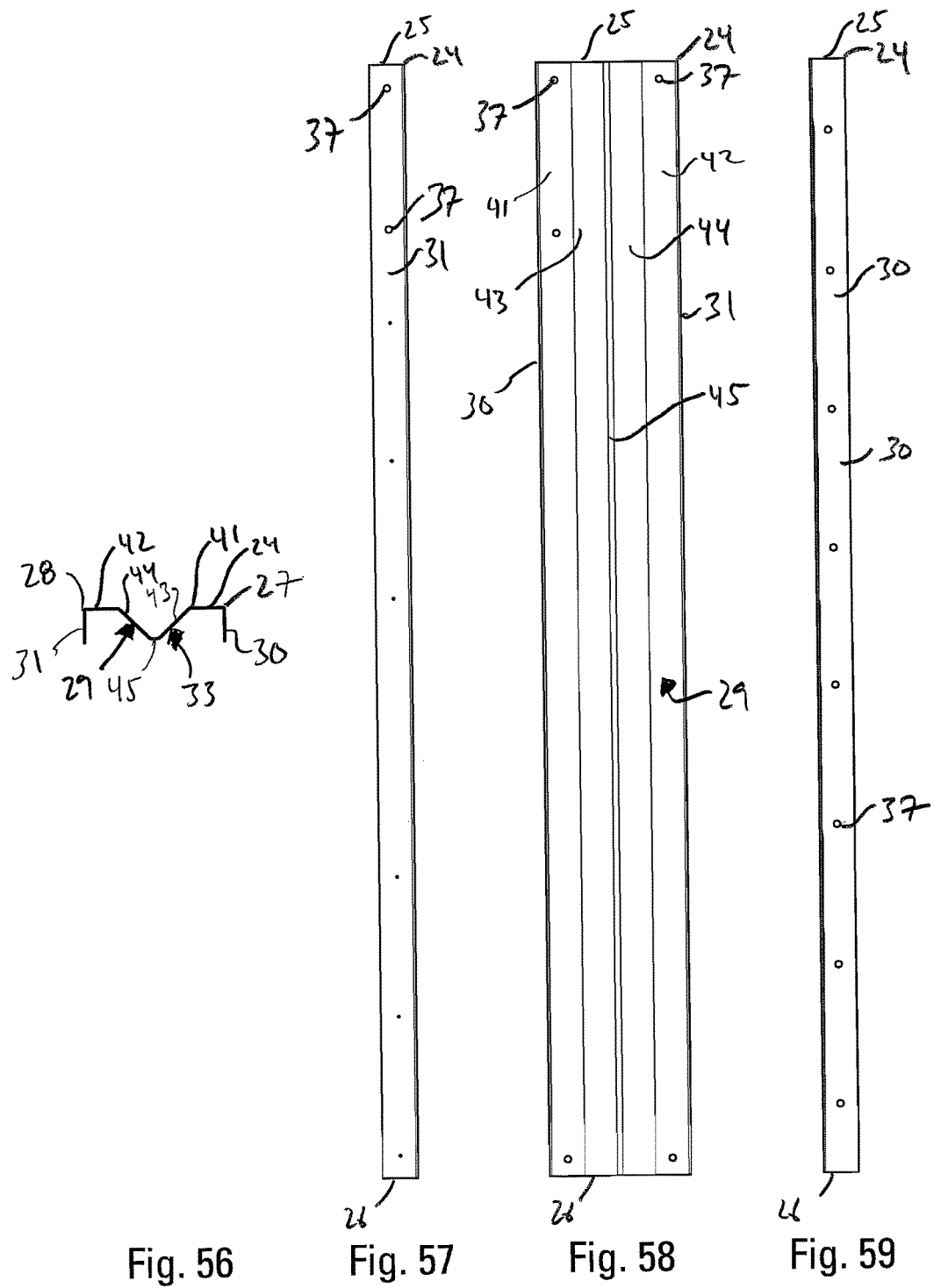

As shown in FIG. 1, the front, back, and left end and right end walls 2, 13, 5 and 9 are made up of a plurality of panels 24. Each panel has a top end 25, a bottom end 26, and left and right side edges 27 and 28. The top end 25, bottom end 26 and left and right side edges 27 and 28 of each panel 24 define a diaphragm 29. The panels 24 have side flanges 30 and 31 attached to the left and right side edges 27 and 28 of the panels 24. As shown in FIGS. 5, 7 and 8, each panel 24 is connected to at least one adjacent panel 24 by at least one fastener 32 received by the panel 24 and the adjacent panel 24 through adjacent side flanges 30 and 31. As shown in FIGS. 4, 36 and 38, each panel is formed with a corrugation 33 in the diaphragm 29 of each panel 24.

As shown in FIGS. 1 and 2, the front and back walls are preferably longer than the end walls, and preferably the front wall is formed with a door way 34, having a door frame 35 and a door 36.

The panels 24 are preferably made from cold-formed steel and are preferably bolted together. The panels 24 are preferably all of the same dimensions, except for the shortened panels disposed over the doorway 34 which are of a different length (see FIG. 2 and FIGS. 40-43), and except for the arrangement of the openings 37 for connecting the panels 24 to each other and to the framing members 38. As shown in FIGS. 36-63, the panels 24 are preferably elongate members having a top end 25, a bottom end 26 and left and right sides edge 27 and 28, with the side edges 27 and 28 being longer than the top and bottom ends 24 and 26. The top and bottom ends 25 and 26 are preferably parallel with each other, as are the left and right side edges 27 and 28, such that the panel 24 is rectangular. The elongated side edges 27 and 28 define the longitudinal dimension of the panel with a longitudinal axis 39 running from the top end 25 to the bottom end 26. The panels 24 are preferably symmetrical in their overall shape along the longitudinal axis 39. The panels 24 also have a lateral axis 40 that extends from the left side edge 28 to the right side edge 28, parallel to the top and bottom ends 25 and 26. The panels 24 are preferably symmetrical in their overall shape along the lateral axis 40.

As shown in FIGS. 1, 5, 7, 8, within each wall 2, 5, 9 and 13 and the roof 18, the sides edges 27 and 28 of the panels 24 are connected to each other. In the preferred embodiment, at the edges 3, 4, 6, 7, 10, 11, 14, and 15 of the walls 2, 5, 9 and 13, where the front and back walls 2 and 13 meet the end walls 5 and 9, the panels 24 at the edges 3, 4, 6, 7, 10, 11, 14, and 15 of the front and back walls 2 and 13 and the end walls 5 and 9 connect to each other. See FIGS. 11 and 12. In the preferred embodiment, in the walls 2, 5, 9 and 13, and the roof 18, the panels 24 attach at their top and bottom ends 25 and 26 to framing members 38. The connections between the panels 24 and between the panels 24 and the framing members 38 are preferably made with fasteners 32. The preferred fasteners 32 are bolts and nuts with washers.

As best seen in FIGS. 4 and 36 through 39, preferably, the panels 24 have a diaphragm 29 that is corrugated, such that the diaphragm 29 has a non-planar cross-section. The corrugation 33 preferably extends the entire height of the panel 24 along its longitudinal axis 39 from its top end 25 to its bottom end 26, but the corrugation 33 does not need to extend the entire height of the panel 24, nor does it need to reach either of the ends 25 and 26.

The corrugation 33 may be any ridge, groove, protrusion or plurality of protrusions, angle or angles formed in the central diaphragm 29 of the panel 24. Preferably, the corrugation 33 extends in the height direction at least partially between the top end 25 and the bottom end 26.

In the preferred embodiment, the panel 24 is formed with a single corrugation 33 that extends from the top end 25 to the bottom end 26. The preferred corrugation 33 creates front and back portions of the diaphragm 29 that lie in different planes. The preferred diaphragm 29 with its corrugation 33 has first and second front planar sections 41 and 42 near the side edges 27 and 28 of the diaphragm 29. The first front planar section 41 is adjacent the left side edge 27 of the panel 24, and the second front planar section 42 is adjacent the right side edge 28 of the panel 24. First and second planar angle sections 43 and 44 extend from the first and second front planar sections 41 and 42, respectively, to a rear planar section 45. The first and second planar angle sections 43 and 44 and the rear planar section 45 make up the corrugation 33 in the preferred embodiment. In the preferred embodiment, all of the sections of the diaphragm 29 run vertically and extend the entire height of the panel 24. The corrugation 33 provides increased ductility to the diaphragm 29 of the panel 24.

As shown in FIG. 36, in the preferred embodiment, the front planar sections 41 and 42 of the diaphragm 29 are coplanar and define the front extent of the panel 24 and the rear planar section 45 is also planar and substantially defines the rear extent of the panel 24 such that the corrugation 33 substantially traverses the entire depth of the panel 24.

Preferably, at the side edges 27 and 28 of the panel 24 there are provided side flanges 30 and 31 that extend substantially the depth of the panel 24. The side flanges 30 and 31 preferably extend the longitudinal height of the panel 24. Preferably, the side flanges 30 and 31 are planar members. Also in the preferred embodiment, the side flanges 30 and 31 lack returns or any additional members that would make them non-planar. The fact that the side flanges 30 and 31 are planar without additional returns allows the panels 24 to overlap at the intersections of the walls 8, 12, 16 and 17. The shapes of the front planar sections 41 and 42 and the side flanges 30 and 31 are preferably symmetrical along the longitudinal axis 39.

Figure 11:
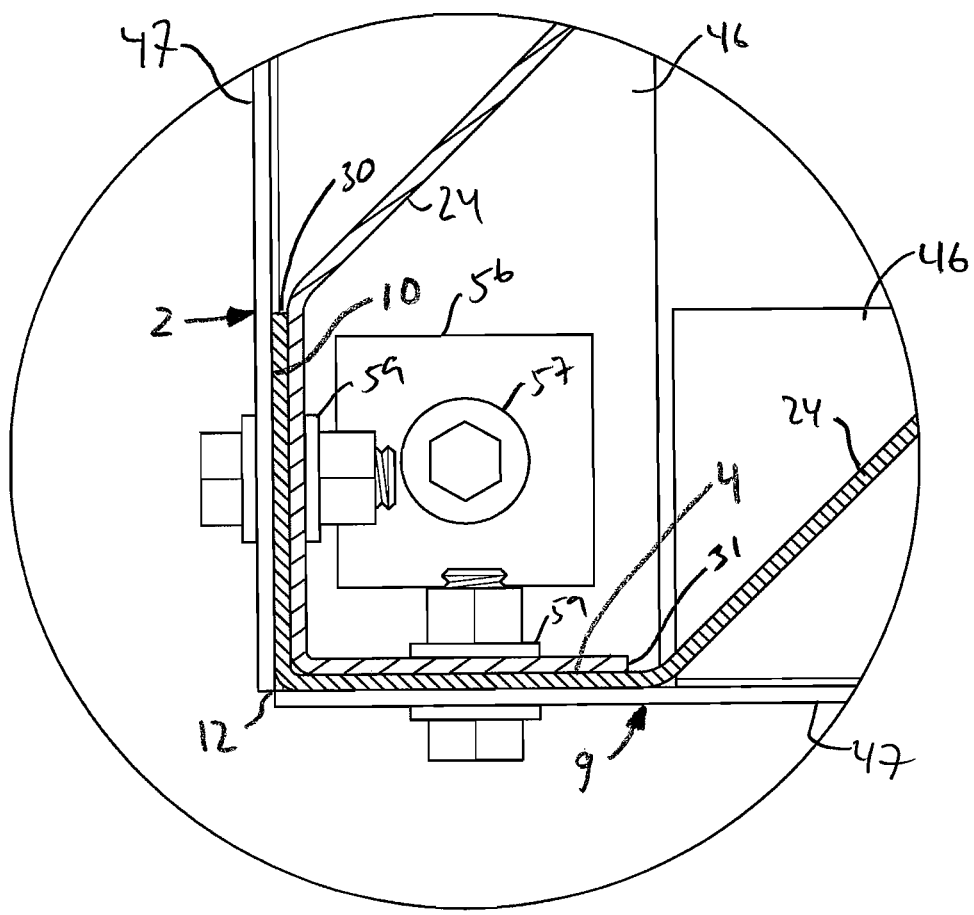
FIG. 11 is a close-up, top plan view of the connection between the panels at the side edge between the front wall and the right end wall of the enclosure of the present invention.

As an example of the overlap, at the left, front edge of the enclosure 8, the panel 24 at the left edge 3 of the front wall 2 is attached to the panel 24 at the front edge 6 of the left end wall 6, with the left side flange 30 of the panel at the left edge 3 of the front wall 2 registering with the second front planar section 42 of the panel 24 at the front edge 6 of the left end wall 5. FIG. 11 which is a sectional, close-up of the right, front edge 12 of the enclosure 1 taken from FIG. 4 is another example of this overlap. The panel 24 at the right edge 4 of the front wall 2 is attached to the panel 24 at the front edge 10 of the right end wall 9, with the right side flange 31 of the panel 24 at the right edge 4 of the front wall 2 registering with the first front planar section 41 of the panel 24 at the front edge 10 of the right end wall 9, and with the second front planar section 42 of the panel 24 at the right edge 4 of the front wall 2 registering with the left side flange 30 of the panel 24 at the front edge 6 of the left end wall 5. The interface between panels at the left and right back edges 16 and 17 of the enclosure 1 is the same.

As shown in FIG. 1, in the preferred embodiment, in the walls 2, 5, 9 and 13 of the enclosure 1, the front planar sections 41 and 42 are disposed outwardly from the inside of the enclosure 1 and the rear planar section 45 is disposed inwardly toward the inside of the enclosure 1, such that the corrugation's concave face faces outwardly from the inside of the enclosure 1 and the convex face of the corrugation 33 faces into the enclosure 1. The side flanges 30 and 31 extend into the enclosure 1.

As shown in FIG. 8, in the preferred embodiment, in the roof 18 of the enclosure 1, the front planar sections 41 and 42 are disposed inwardly toward the inside of the enclosure 1 and the rear planar section 45 is disposed outwardly from the inside of the enclosure, such that the corrugation's concave face faces inwardly into the enclosure and the convex face of the corrugation 33 faces away from the inside of the enclosure 1. The side flanges 30 and 31 of the roof panels 24 extend outwardly from the interior of the enclosure 1.

As shown in FIG. 5, preferably, a plurality of longitudinally spaced fasteners 32 extend through the side flanges 30 and 31 of in-line, adjacent panels 24 to connect them. In a similar fashion, fasteners 32 are used to connect adjacent panels at the edges of the enclosure 8, 12, 16 and 17.

As shown in FIGS. 38, 42, 46, 50, 54, 58, and 63, in the preferred embodiment, the front planar sections 41 and 42 of the diaphragm 29 will also have fastener openings 32 for connecting the panels 24 to each other and to the framing members 38. Depending on where the panel member 24 is to be positioned in the enclosure, it will have a particular arrangement of fastener openings 37 in the front planar sections 41 and 42 and the side flanges 30 and 31. In the preferred embodiment, all of the panels 24 are formed with openings in the front planar sections 41 and 42 at the four corners of the panel 24, for connecting each panel 24 at its top and bottom at two points. The panels 24 that are disposed at the edges 8, 12, 16 and 17 of the enclosure 1 are then formed with additional openings 37 along the side of the panel 24 that will be disposed at the enclosure edge 8, 12, 16 or 17.

As shown in FIGS. 1, 2, 3 and 6, preferably, each wall 2, 5, 9 and 13 of the enclosure 1 has framing members 38 that extend the length of each wall. The framing members 38 connect the upper portions of the walls to the roof 18 by means of fasteners 32 that connect the upper portions of the panels to the framing member 38 and by fasteners 32 that connect the framing member to the panels 24 of the roof 18 having boundary portions at the side edges 19, 20, 21 and 22 of the roof 18.

As shown in FIGS. 21-26, the framing members 38 are preferably two elongated members joined at a 90 degree angle, creating a horizontally disposed flange 46 and a vertically disposed member 47 when installed. In the preferred embodiment, the first and second framing members 38 at the tops of the end walls 5 and 9 are T-shaped top caps 48, and for the front and back walls are L-shaped angle members 49. In the preferred embodiment, there are four top framing members 38 in total.

Figures 24, 25, 26:
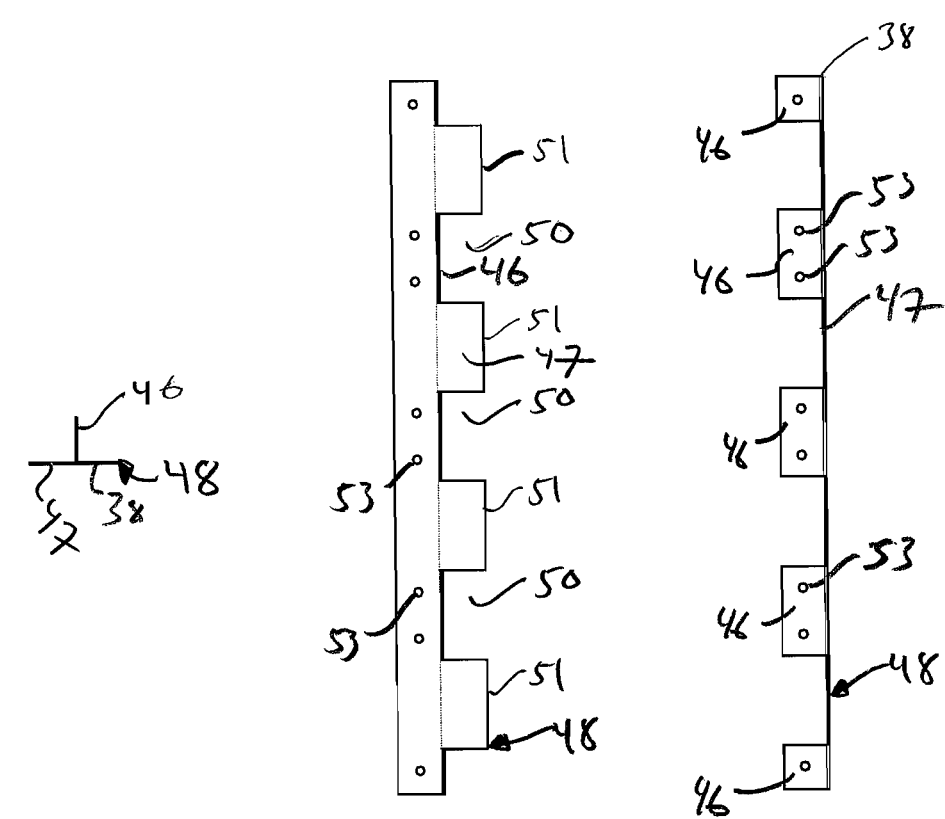
FIG. 24 is an end view of the top caps of the end walls of the enclosure of the present invention.
FIG. 25 is a front view of the top caps of the end walls of the enclosure of the present invention.
FIG. 26 is a top view of the top caps of the end walls of the enclosure of the present invention.
Figure 27:
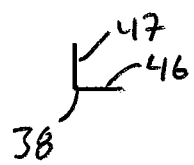
FIG. 27 is an end view of the bottom caps of the end walls of the enclosure of the present invention.
Figure 28:
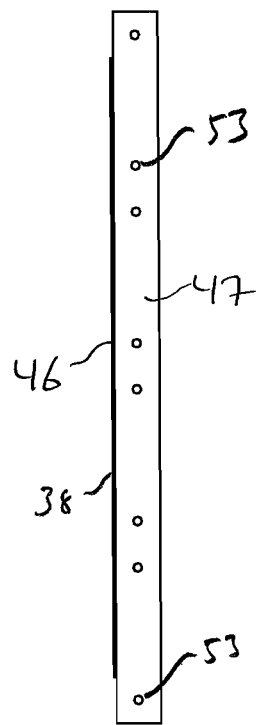
FIG. 28 is a front view of the bottom caps of the end walls of the enclosure of the present invention.
Figure 29:
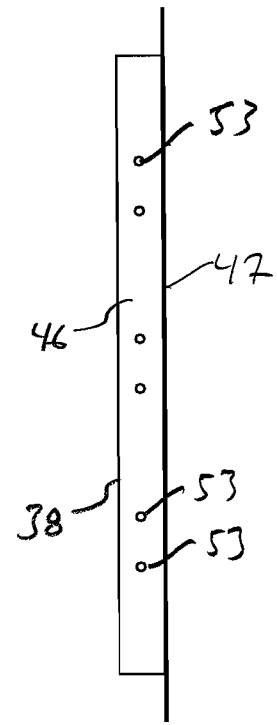
FIG. 29 is a top view of the bottom caps of the end walls of the enclosure of the present invention.

As shown in FIGS. 25 and 26, in the preferred embodiment, the vertical walls 47 of the T-shaped end wall top caps 48 are formed with regularly spaced notches 50, creating projections 51. The material of the notches is bent orthogonally to create the horizontal flange 46. The portions of the horizontal flange 46 are not continuous. The projections 51 of the vertical flange 47 between the notches 50 cover the open ends 52 of roof panels 24 where the corrugation 33 of the roof panels 24 would create an opening. As shown, in the preferred embodiment, the front planar sections 41 and 42 of the roof panels 24 are aligned and connect to the horizontal flange 46 of the end top caps 48, with the corrugation 33 extending above the plane created by the front panel sections 41 and 42. The projections 51 of the top caps 48 cover the protruding corrugation 33 of the roof panels 24. The horizontal flanges 46 of the L-shaped angle members 49 connect to front planar sections 41 or 42 of roof panels 24 by means of fasteners 32, and the vertical wall 47 of the L-shaped angle members 49 connects to the front planar sections 41 and 42 of wall panels 24.

As shown in FIGS. 1, 2, 3 and 4, similarly, each wall 2, 5, 9 and 13 of the enclosure 1 has bottom framing members 38 that connect the bases of the panels 24 to the base 23 of the enclosure 1. In the preferred embodiment, the back wall 13, and the end walls 5 and 9 have bottom framing members 38 that extend the length of those walls. In the preferred embodiment, where a doorway 34 is formed in the front wall 2, the front wall 2 has two bottom framing members 38 that are disposed underneath the panels 24 that are anchored to the base 23, with no bottom framing member underneath the doorway 34. In the preferred embodiment, there are five bottom framing members in total.

Preferably, the framing members 38 are formed with openings 53 at predetermined locations for receiving the fasteners that will connect the framing members 38 to the panels 24 and the fasteners 54 that will connect the framing members 38 to the base foundation 23 of the enclosure 1.

Figure 12:
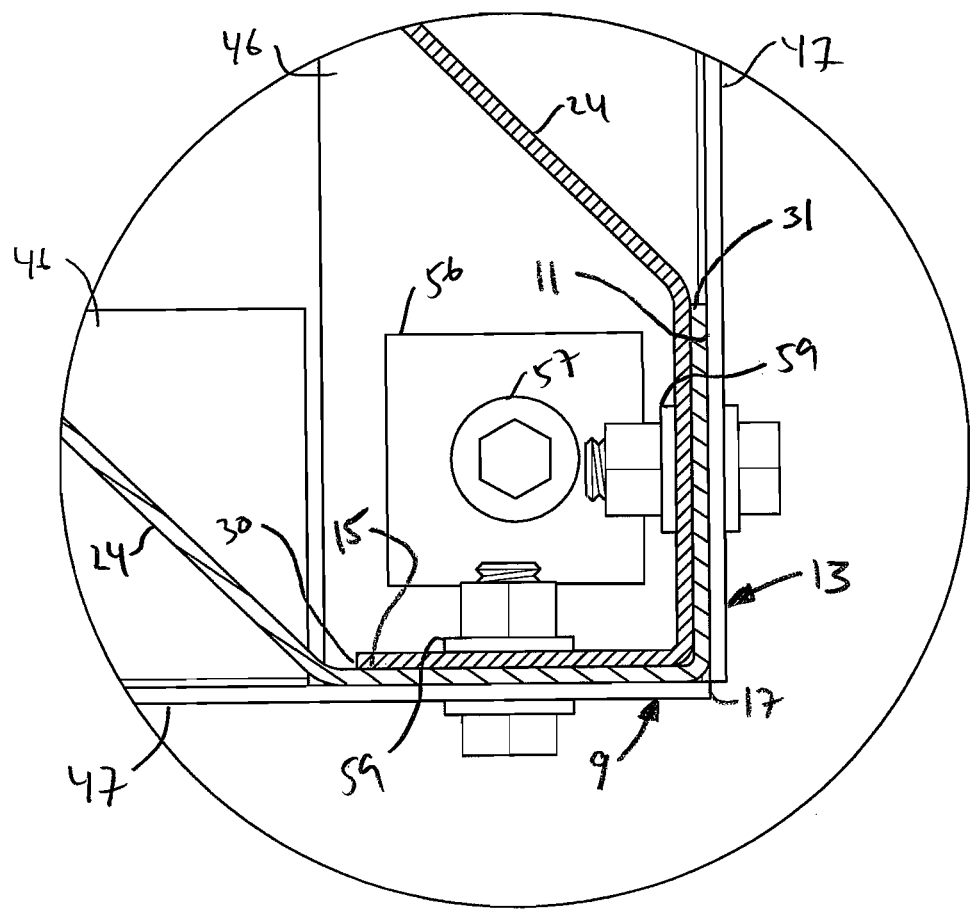
FIG. 12 is a close up, top plan view of the connection between the panels at the side edge between the back wall and right end wall of the enclosure of the present invention.

As shown in FIGS. 4, 11 and 12, in the preferred embodiment, the bottom framing members are formed such that the horizontal flanges 46 resting on the base 23 of the enclosure 1 do not overlap each other where they meet at the corners of the enclosure 1. In the preferred embodiment, the ends of the horizontal flanges 46 of the framing members 38 for the end walls 5 and 9 do not extend as far as the vertical flanges 47, so that the horizontal flange 46 of the framing member 38 of the end wall 5 or 9 does not overlap the corresponding horizontal flange 46 of the framing member 38 of the framing members 38 of the front and back walls 2 and 13.

Figure 13:
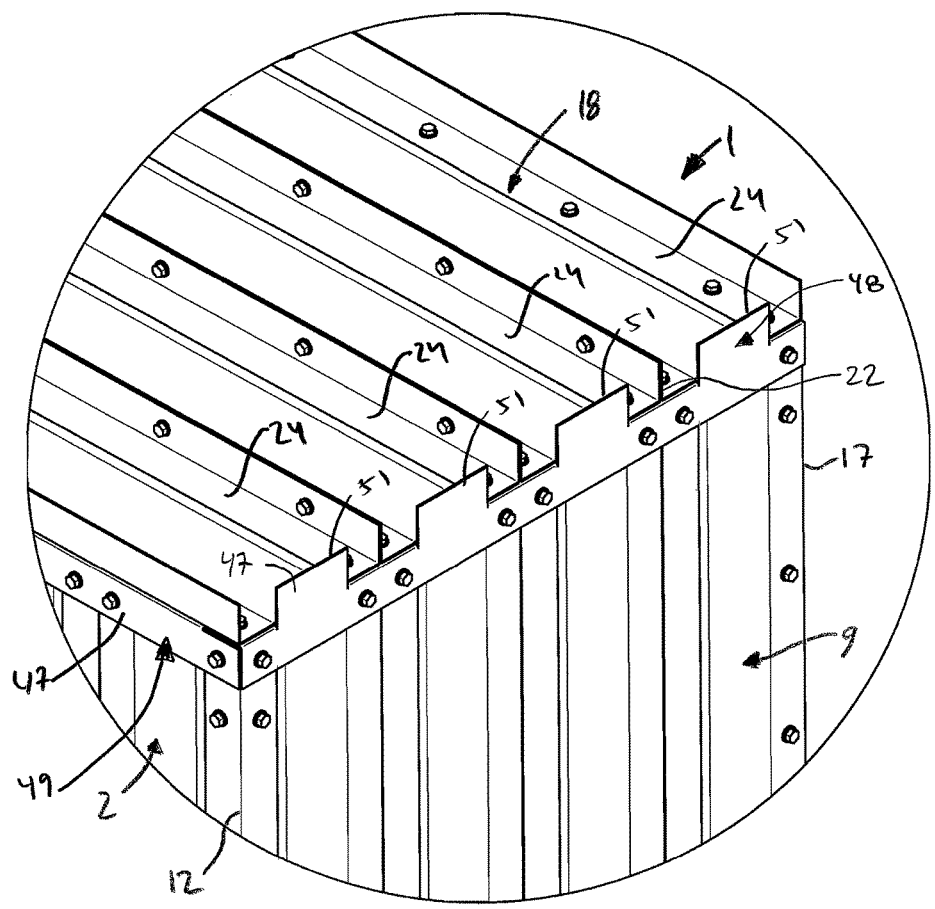
FIG. 13 is a perspective view, showing portions of the roof, the front wall and right end wall of the enclosure of the present invention.
Figure 14:
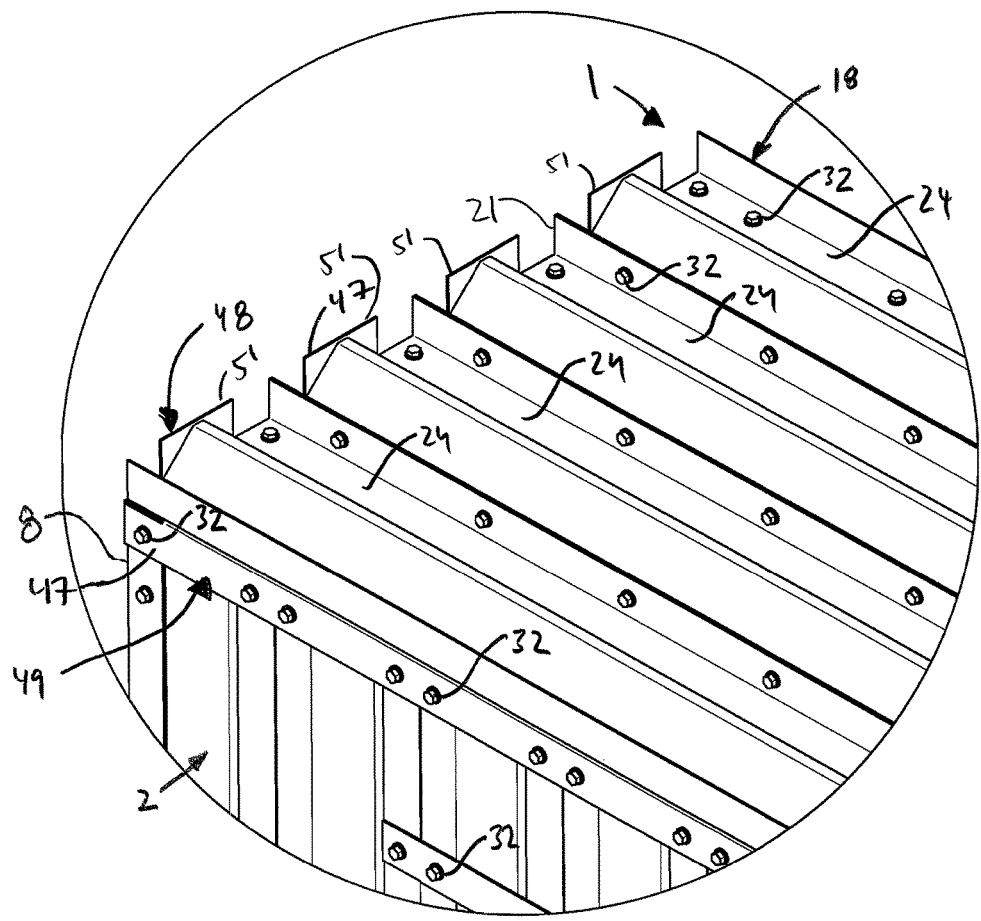
FIG. 14 is a perspective view, showing portions of the roof and the front wall of the present invention.
Figure 15:
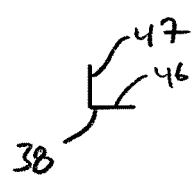
FIG. 15 is an end view of one of the bottom caps of the front wall of the enclosure of the present invention.
Figure 16:
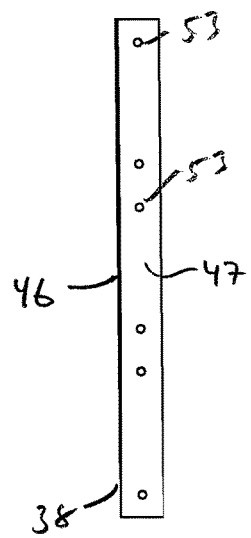
FIG. 16 is a front view of one of the bottom caps of the front wall of the enclosure of the present invention.
Figure 17:
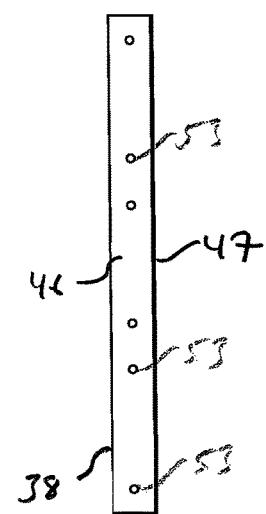
FIG. 17 is a top view of one of the bottom caps of the front wall of the enclosure of the present invention.
Figures 18, 19, 20:
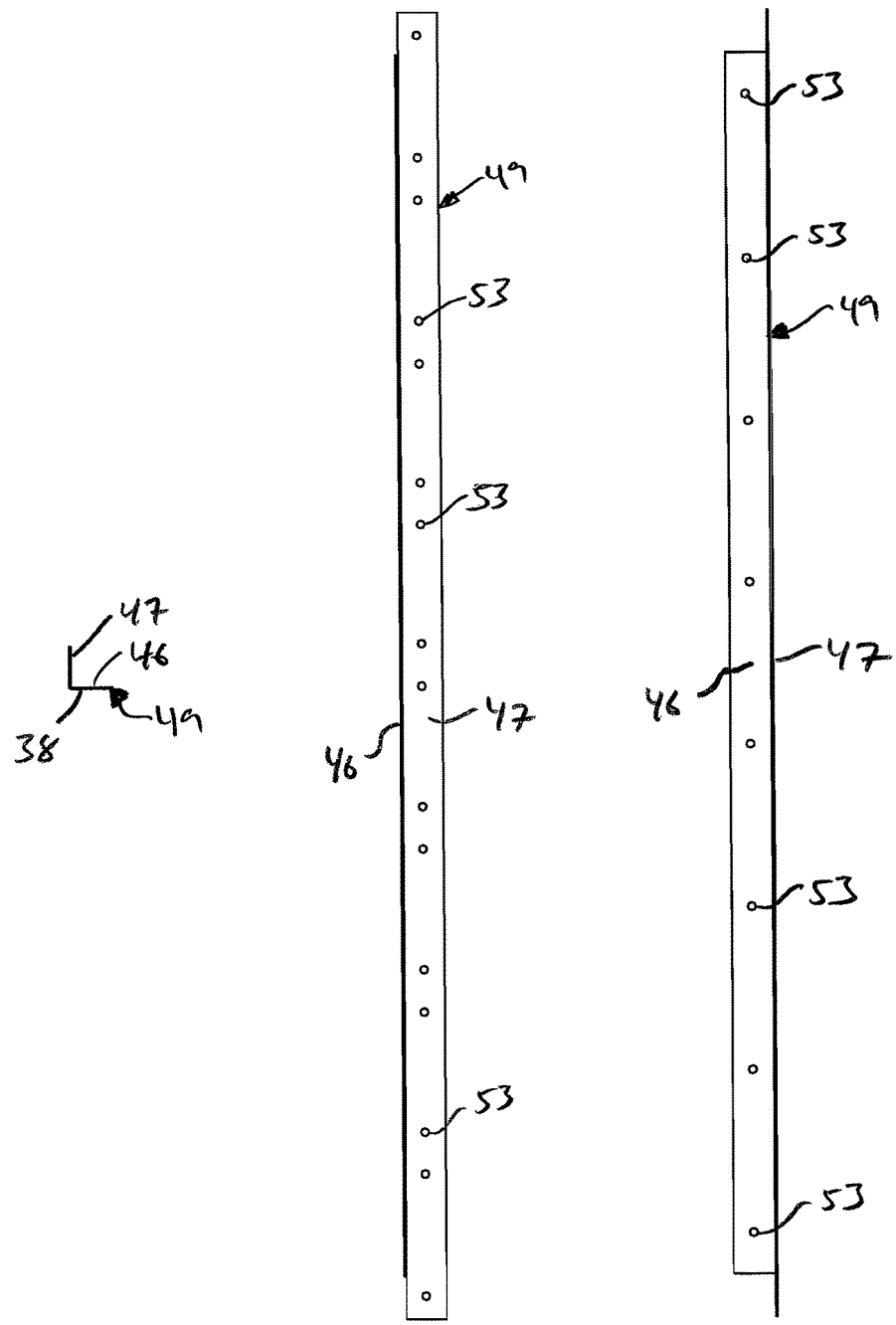
FIG. 18 is an end view of the top caps of the front and back walls of the enclosure of the present invention.
FIG. 19 is a front view of the top caps of the front and back walls of the enclosure of the present invention.
FIG. 20 is a top view of the top caps of the front and back walls of the enclosure of the present invention.
Figure 21:
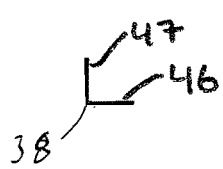
FIG. 21 is an end view of the bottom cap of the back walls of the enclosure of the present invention.
Figure 22:
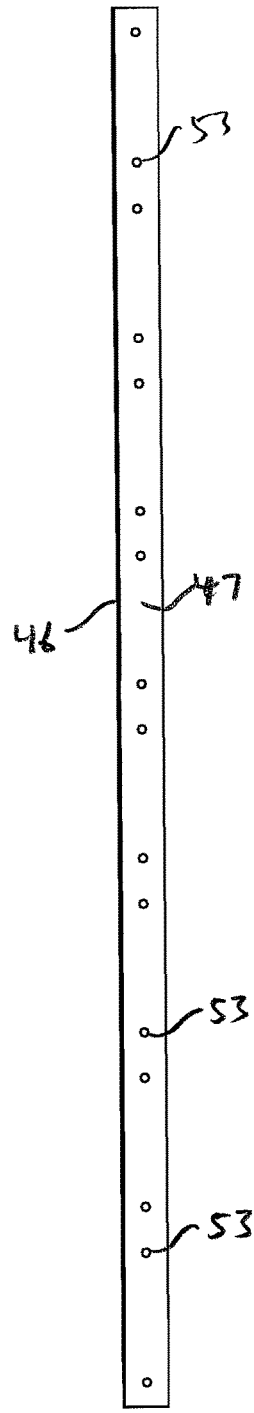
FIG. 22 is a front view of the bottom cap of the back wall of the enclosure of the present invention.
Figure 23:
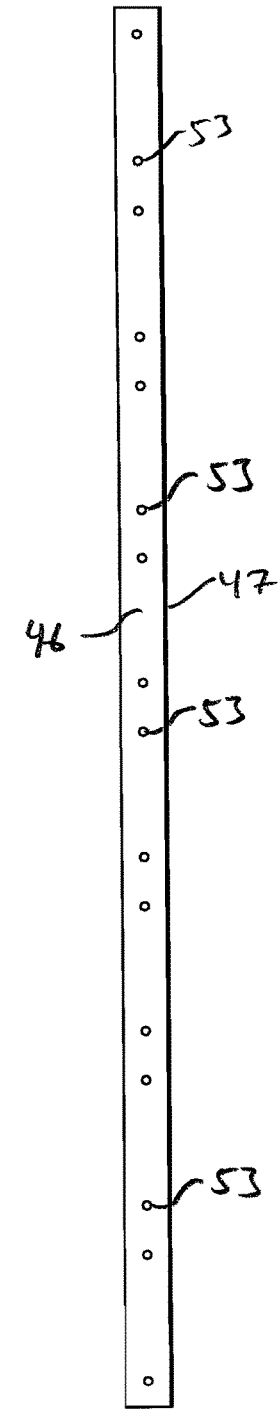
FIG. 23 is a top view of the bottom cap of the front wall of the enclosure of the present invention.

As shown in FIGS. 2 and 3 and 4 and 11, in the preferred embodiment, the vertical member 47 of the bottom framing members 38 is located on the outside of the wall panels 24. Similarly, as shown in FIG. 13, the vertical flange of the top framing member 38 is located on the outside of the wall panels 24. As is also shown in FIG. 13, the horizontal flange 46 of the top framing members 38 is disposed underneath the roof panels 24.

As shown in FIGS. 1, 2 and 33-35, a lintel 55 is also provided for above the doorway 34 to anchor the bottom portions of the shortened panels 24 that are provided above the doorway 34.

As shown in FIG. 4, each bottom framing member has an anchor 54 in its horizontal flange 46 near the bottom corners of each panel 24. The preferred anchors 54 are thread-in anchors for being set in a predrilled bore in the foundation base 23. Preferably, a high strength washer 56 is disposed between the head 57 of the anchor 54 and the horizontal flange 46 of the bottom cap or framing member 38.

As shown in FIGS. 5, 7, 8 and 10, in the preferred embodiment, within the walls 2, 5, 9 and 13, where aligned panels 24 connect to each other, no additional members are provided and the side flanges 30 and 31 of adjacent panels 24 register with each other, and are connected directly to each other. In the preferred embodiment, the openings 37 in the interfacing side flanges 30 and 31 of adjacent panels are aligned with each other and fasteners 32 disposed in the aligned openings 37 connect the adjacent panels 24.

As shown in FIG. 11, in the preferred embodiment, at the edges 8, 12, 16 and 17 of the enclosure 1, where the walls 2, 5, 9 and 13 connect to each other, no framing members are provided. The panels 24 at each edge 3 and 4 of the front wall 2 connects directly to the panel 24 at the edge 6 or 10 of the end wall 5 or 9 adjacent to it, and similarly, the panels 24 at each edge 14 and 15 of the back wall 13 connect directly to the panel 24 at the edge 7 or 11 of the end wall 3 or 9 adjacent to it. FIG. 11 is a close up view, taken from FIG. 4, of the connection between the front wall 2 and the right end wall 9. The edge panel 24 of the front wall 2 is received by the edge panel 24 of the right end wall 9. In particular, the second or right front planar section 42 of the panel 24 of the front wall 2 interfaces with the left side flange 30 of the panel 24 of the right end wall 9. The right or second front section 42 of the panel 24 of the front wall 2 is connected to the left side flange 30 of the panel 24 of the right front wall 9 by fasteners 32. Similarly, the right side flange 31 of the panel 24 of the front wall 2 interfaces with the left or first front planar section 41 of the panel 24 of the right end wall 9 and is connected to it by fasteners 32. In the preferred embodiment of the enclosure 1, the connections between the walls at the three other edges 11, 16 and 17 of the enclosure are similar with the panel 24 of the front or back wall 2 or 9 received by the panel 24 of the end wall 5 or 9. FIG. 12 is a close up view, taken from FIG. 4, of the right edge connection between the back wall 13 and the right end wall 9.

Figure 9:
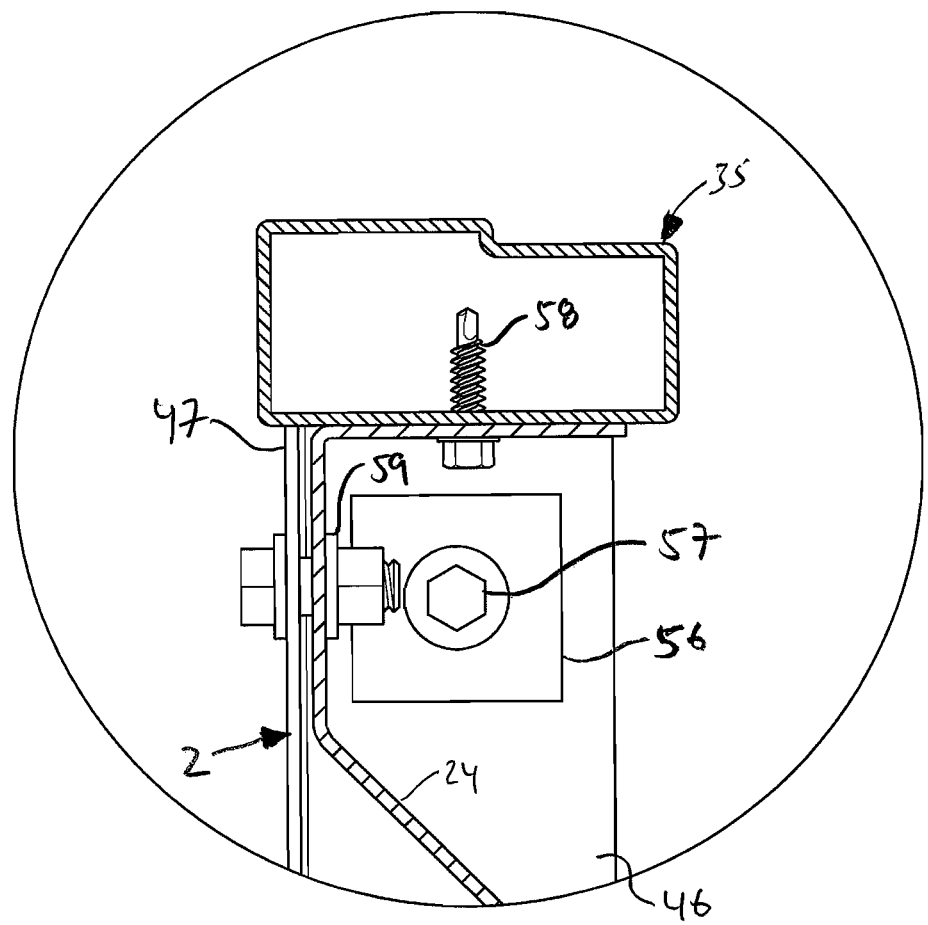
FIG. 9 is a close-up, top plan view of the connection of the door frame to a panel in the front wall of the enclosure of the present invention.
Figure 10:
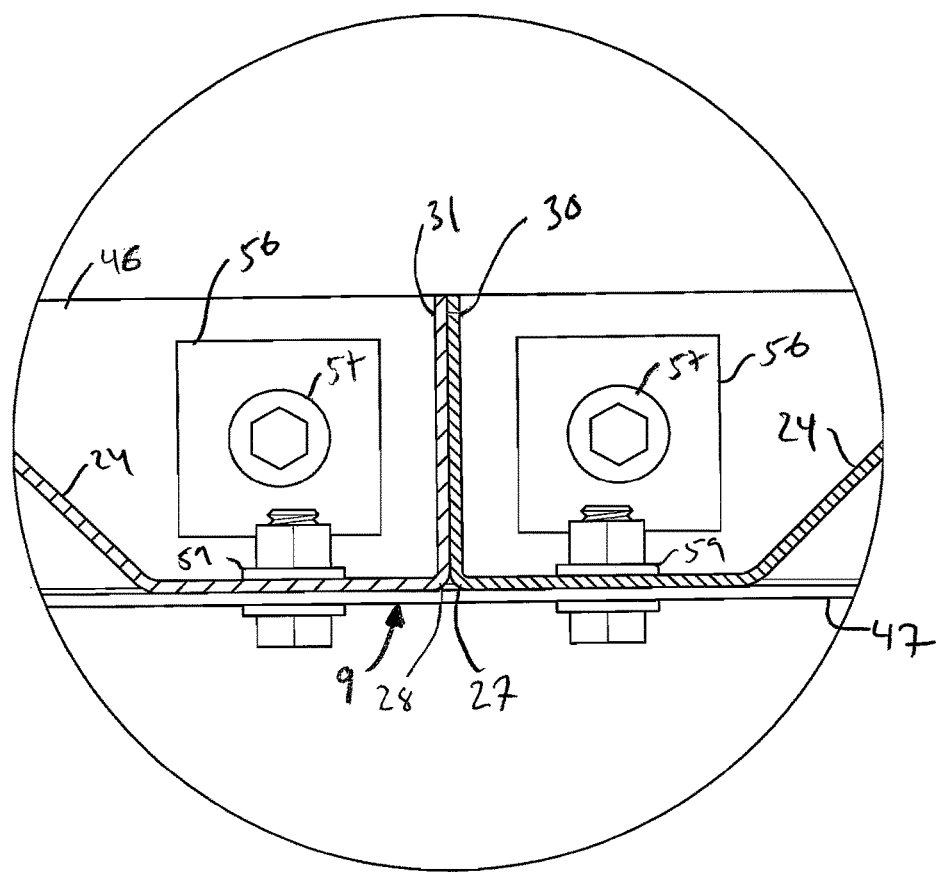
FIG. 10 is a close-up, top plan view of the connection between two panels in the right end wall of the enclosure of the present invention.

As shown in FIG. 9, the door frame 35 is connected to panels 24 in the front wall 2 with screws 58 driven through the side flanges 30 and 31 of the panels 24. As shown in FIG. 35, the lintel 55 for the door way 34 is formed with smaller openings in the horizontal flange 46 to indicate that threaded screw fasteners 58 are used to connect the top of the door frame 35 to the lintel 55.

An enclosure 1 formed according to the present invention can be assembled in the following manner. The bottom caps or framing members 38 are rigidly connected to the base foundation 23 using appropriate anchors 54. Then the panels 24 of the walls 2, 5, 9, and 13 are connected to the bottom caps 38, and the top caps or framing member 38 are connected to the panels 24 of the walls 2, 5, 9, and 13. The roof 18 is installed on the last.

Preferably, the panels 24 are formed from 10 gauge, grade 33, G 90 cold-formed sheet steel. The wall panels are preferably 96 inches tall, 12 inches wide and three inches deep. The front planar sections 41 and 42 of the panels are three inches wide. The corrugation is six inches wide. In the preferred embodiment, the planar angled sections 43 and 44 of the corrugation 33 are set at 90 degrees to each other. The planar horizontal flanges 46 and vertical walls 47 of the framing members 38 are preferably three inches wide, except the vertical members of the top caps 48 of the end walls 5 and 9 which are six inches tall. The presence of the corrugation 33 allows the panels to be made from light gauge steel and still be able to resist penetration by flying debris, and in particular to meet the criteria set for a 2×4 projectile.

Preferred fasteners 32 for connecting the panels 24 and the framing members 38 to each other are bolts with nuts. Washers 59 help the bolt from being pulled through the openings in the framing members 38 and the panels 24.

I claim:

1. A protective enclosure, comprising:
   a. a front wall having a left edge and a right edge;
   b. a left end wall having a front edge and a back edge, the left end wall being attached to the front wall at a left, front edge of the enclosure;
   c. a right end wall having a front edge and a back edge, the right end wall being attached to the front wall at a right, front edge of the enclosure;
   d. a back wall having a left edge and a right edge, the back wall being attached to the left end wall at a left, back edge of the enclosure, and the back wall being attached to the right end wall at a right, back edge of the enclosure;
   e. a roof having front, back and left and right boundary edges, the roof being attached to the front wall at the front boundary edge, the roof being attached to the back wall at the back boundary edge, the roof being attached to the left end wall at the left boundary edge, and the roof being attached to the right end wall at the right boundary edge;
   f. a base for the enclosure with the front, back, left end and right end walls being attached to the base;
   g. an opening in the enclosure large enough for a human to enter and exit the enclosure, the opening being able to be covered; wherein
   h. the front, back, and left end and right end walls have a plurality of panels, each panel having a top end, a bottom end, and left and right side edges, the top end, bottom end and left and right side edges of each panel defining a diaphragm, the panels having side flanges attached to the left and right side edges of the panels, wherein each panel is connected to at least one adjacent panel by at least one fastener received by the panel and the adjacent panel through adjacent side flanges; and
   i. each panel is formed with a corrugation in the diaphragm, and the diaphragm has a first front planar section adjacent the left side edge of the panel, and the diaphragm has a second front planar section adjacent the right side edge of the panel; and
   j. at the left, front edge of the enclosure, the panel at the left edge of the front wall is attached directly to the panel at the front edge of the left end wall, with the side flange at the left side edge of the panel at the left edge of the front wall registering and overlapping with the second front planar section of the diaphragm of the panel at the front edge of the left end wall, and with the first front planar section of the diaphragm of the panel at the left edge of the front wall registering and overlapping with the right side flange of the panel at the front edge of the left end wall.

2. The protective enclosure of claim 1, wherein:
   a. the corrugation in the diaphragm extends from the top end to the bottom end of the panel and the first front planar section adjacent the left side edge of the panel extends from the top end to the bottom end of the panel, and the second front planar section adjacent the right side edge of the panel extends from the top end to the bottom end of the panel and the corrugation in the diaphragm is disposed between the first and second front planar sections of the diaphragm, and the corrugation in the diaphragm has a first angle section that extends from the first front planar section at an angle to a rear planar section, and b. the corrugation in the diaphragm has a second angle section that extends from the second front planar section at an angle to the rear planar section.

3. The protective enclosure of claim 2, wherein:
a. each panel has a longitudinal axis that extends from the top end of the panel to the bottom end of the panel, and
b. each panel is symmetrical about the longitudinal axis.

4. A protective enclosure, comprising:
a. a front wall having a left edge and a right edge;
b. a left end wall having a front edge and a back edge, the left end wall being attached to the front wall at a left, front edge of the enclosure;
c. a right end wall having a front edge and a back edge, the right end wall being attached to the front wall at a right, front edge of the enclosure;
d. a back wall having a left edge and a right edge, the back wall being attached to the left end wall at a left, back edge of the enclosure, and the back wall being attached to the right end wall at a right, back edge of the enclosure;
e. a roof having front, back and left and right boundary edges, the roof being attached to the front wall at the front boundary edge, the roof being attached to the back wall at the back boundary edge, the roof being attached to the left end wall at the left boundary edge, and the roof being attached to the right end wall at the right boundary edge;
f. a base for the enclosure with the front, back, left end and right end walls being attached to the base;
g. an opening in the enclosure large enough for a human to enter and exit the enclosure, the opening being able to be covered; wherein
h. the front, back, and left end and right end walls have a plurality of panels, each panel having a top end, a bottom end, and left and right side edges, the top end, bottom end and left and right side edges of each panel defining a diaphragm, the panels having side flanges attached to the left and right side edges of the panels, wherein each panel is connected to at least one adjacent panel by at least one fastener received by the panel and the adjacent panel through adjacent side flanges;
i. each panel is formed with a corrugation in the diaphragm;
j. the roof is also formed from a plurality of panels separate from the panels of the front, back, and left end and right end walls, each panel having a top end, a bottom end, and left and right side edges, the top end, bottom end and left and right side edges of each panel defining a diaphragm, the panels having side flanges attached to the left and right side edges of the panels, wherein each panel is connected to at least one adjacent panel by at least one fastener received by the panel and the adjacent panel through adjacent side flanges and each panel is formed with a corrugation in the diaphragm of each panel and the corrugation in the diaphragm extends from the top end to the bottom end of the panel;
k. a first top cap is provided for the left end wall to attach the roof to the left end wall;
l. a second top cap is provided for the right end wall to attach the roof to the right end wall; and
m. the first and second top caps have vertical walls that substantially cover the protruding corrugation and the open ends of the roof panels at the corrugations in the diaphragms of each panel in the roof.

5. The enclosure of claim 4, wherein:
a. each of the first top cap for the left end wall and the second top cap for the right end wall has a vertical wall and a horizontal flange, wherein
b. the vertical wall of the first top cap connects to the panels of the left end wall;
c. the vertical wall of the second top cap connects to the panels of the right end wall;
d. the horizontal flange of the first top cap connects to the panels of the roof; and
e. the horizontal flange of the second top cap connects to the panels of the roof.

6. The enclosure of claim 5, wherein:
a. the horizontal flanges of the first and second top caps are not continuous;
b. the vertical walls of the first and second top caps are formed with notches, creating upstanding projections.

7. The enclosure of claim 6, wherein:
the projections of the vertical walls of the first and second top caps substantially cover the top and bottom ends of the panels in the roof at the corrugations in the diaphragms of each panel in the roof.

8. The enclosure of claim 7, wherein:
a. the diaphragms of the roof panels have a first front planar section adjacent the left side edge of each roof panel that extends from the top end to the bottom end of the roof panel, and the diaphragms of the roof panels have a second front planar section adjacent the right side edge of each panel that extends from the top end to the bottom end of each panel and the corrugation in the diaphragm is disposed between the first and second front planar sections of the diaphragm; and
b. the front planar sections of the roof panels are aligned and connect to the horizontal flange of the first and second top caps.

9. The enclosure of claim 8, wherein
the fasteners are bolts with nuts.

10. The enclosure of claim 9, wherein:
the opening is a doorway in a wall of the enclosure, and a door is fitted into the door way to cover the doorway.

11. The protective enclosure of claim 4, wherein:
a. the corrugation in the diaphragm of reach roof panel has a first angle section that extends from the first front planar section at an angle to a rear planar section, and
b. the corrugation in the diaphragm has a second angle section that extends from the second front planar section at an angle to the rear planar section.

12. The protective enclosure of claim 11, wherein:
a. each roof panel has a longitudinal axis that extends from the top end of the panel to the bottom end of the panel, and
b. each roof panel is symmetrical about the longitudinal axis.

13. The protective enclosure of claim 12, wherein:
at the left, front edge of the enclosure, the panel at the left edge of the front wall is attached to the panel at the front edge of the left end wall, with the side flange of the left side edge of the panel at the left edge of the front wall registering with the diaphragm of the panel at the front edge of the left end wall.

14. The protective enclosure of claim 8, wherein:
a. the corrugation in the diaphragm of each roof panel has a first angle section that extends from the first front planar section at an angle to a rear planar section, and
b. the corrugation in the diaphragm of each roof panel has a second angle section that extends from the second front planar section at an angle to the rear planar section.

15. The protective enclosure of claim 14, wherein:
a. each roof panel has a longitudinal axis that extends from the top end of the panel to the bottom end of the panel, and
b. each roof panel is symmetrical about the longitudinal axis.

16. The protective enclosure of claim 15, wherein:
at the left, front edge of the enclosure, the panel at the left edge of the front wall is attached to the panel at the front edge of the left end wall, with the side flange of the left side edge of the panel at the left edge of the front wall registering with the diaphragm of the panel at the front edge of the left end wall.

17. The protective enclosure of claim 1, wherein:
a. the roof is also formed from a plurality of panels separate from the panels of the front, back, and left end and right end walls; and
b. the panels that make up the roof, front, back, and left and right end walls are generally planar members that can lay flat.

18. The protective enclosure of claim 8, wherein:
the panels that make up the roof, front, back, and left and right end walls are generally planar members that can lay flat.

* * * * *